(12) United States Patent
Pape

(10) Patent No.: US 9,619,346 B2
(45) Date of Patent: Apr. 11, 2017

(54) VIRTUAL MACHINE INTROSPECTION FACILITIES

(71) Applicant: Assured Information Security, Inc., Rome, NY (US)

(72) Inventor: Stephen Raymond Pape, Marcy, NY (US)

(73) Assignee: ASSURED INFORMATION SECURITY, INC., Rome, NY (US)

( * ) Notice: Subject to any disclaimer, the term of this patent is extended or adjusted under 35 U.S.C. 154(b) by 190 days.

(21) Appl. No.: 14/525,803

(22) Filed: Oct. 28, 2014

(65) Prior Publication Data

US 2015/0121135 A1    Apr. 30, 2015

Related U.S. Application Data

(60) Provisional application No. 61/898,147, filed on Oct. 31, 2013.

(51) Int. Cl.
*G06F 11/07*     (2006.01)
*G06F 11/14*     (2006.01)
*G06F 9/455*     (2006.01)

(52) U.S. Cl.
CPC ...... *G06F 11/1484* (2013.01); *G06F 9/45558* (2013.01); *G06F 11/0712* (2013.01); *G06F 2009/45595* (2013.01)

(58) Field of Classification Search
CPC ............. G06F 11/0712; G06F 11/1484; G06F 2009/45591
USPC .......................................................... 714/27
See application file for complete search history.

(56) References Cited

U.S. PATENT DOCUMENTS

| 7,996,836 B1 | 8/2011 | McCorkendale et al. |
| 8,195,980 B2 | 6/2012 | Schuba et al. |
| 8,276,201 B2 | 9/2012 | Schunter et al. |
| 8,307,443 B2 | 11/2012 | Wang et al. |

(Continued)

FOREIGN PATENT DOCUMENTS

| EP | 2237154 A2 | 6/2010 |
| EP | 2237154 A3 | 6/2010 |
| WO | 2008130923 A1 | 10/2008 |

OTHER PUBLICATIONS

International Search Report from International Application No. PCT/US 14/63387 dated Jan. 26, 2015.

(Continued)

*Primary Examiner* — Chae Ko
(74) *Attorney, Agent, or Firm* — Matthew M. Hulihan, Esq.; Heslin Rothenberg Farley & Mesiti PC

(57) ABSTRACT

Run-time, event-driven virtual machine introspection of the target guest virtual machine is facilitated as described herein. A component can specify events that are of interest to the component for introspection of a target guest virtual machine of a hypervisor. The hypervisor detects an introspection event generated by a target guest virtual machine and determines whether the introspection event is of interest for handling by a component coupled to the hypervisor. If so, the hypervisor alerts the component about the introspection event and provides information associated with the introspection event to the component. The component thereby receives notification of occurrence of the introspection event from the hypervisor and may obtain information associated with the introspection event.

31 Claims, 16 Drawing Sheets

(56) References Cited

U.S. PATENT DOCUMENTS

| | | | | |
|---|---|---|---|---|
| 2008/0120485 | A1* | 5/2008 | Rothman | G06F 12/06 711/165 |
| 2008/0320594 | A1 | 12/2008 | Jiang | |
| 2009/0070761 | A1* | 3/2009 | Zhao | G06F 9/45558 718/1 |
| 2009/0241109 | A1 | 9/2009 | Vandegrift et al. | |
| 2010/0031360 | A1 | 2/2010 | Seshadri et al. | |
| 2011/0047315 | A1* | 2/2011 | De Dinechin | G06F 1/14 711/6 |
| 2011/0258610 | A1* | 10/2011 | Aaraj | G06F 21/554 717/128 |
| 2011/0321165 | A1 | 12/2011 | Capalik et al. | |
| 2011/0321166 | A1 | 12/2011 | Capalik et al. | |
| 2012/0137045 | A1* | 5/2012 | Bacher | G06F 12/109 711/6 |
| 2012/0137291 | A1* | 5/2012 | Bacher | G06F 9/45558 718/1 |
| 2012/0240224 | A1 | 9/2012 | Payne et al. | |
| 2012/0291030 | A1 | 11/2012 | Fitzgerald et al. | |
| 2012/0317570 | A1* | 12/2012 | Dalcher | G06F 21/53 718/1 |
| 2013/0254768 | A1 | 9/2013 | Wipfel et al. | |
| 2013/0276056 | A1 | 10/2013 | Epstein | |
| 2014/0137180 | A1* | 5/2014 | Lukacs | G06F 21/53 726/1 |
| 2014/0201374 | A1* | 7/2014 | Ashwood-Smith | H04L 49/70 709/226 |
| 2015/0033227 | A1* | 1/2015 | Lin | G06F 21/55 718/1 |
| 2015/0186641 | A1* | 7/2015 | Cabrera | G06F 21/554 726/23 |

OTHER PUBLICATIONS

Nance, Kara, et al., "Virtual Machine Introspection" [retrieved Apr. 11, 2013]. Retrieved from Internet: <URL: http://assert.edu/papers/vmIntrospection_ieeesp08.pdf>, published by the IEEE Computer Society, 2008, pp. 32-37.

"About LibVMI", [retrieved Oct. 28, 2014]. Retrieved from Internet: <URL: https://code.google.com/p/vmitools/wiki/LibVMIIntroduction>, updated May 22, 2012, 2 pgs.

"About the VMI Tools Project", [retrieved Oct. 28, 2014]. Retrieved from Internet: <URL: https://code.google.com/p/vmitools>, 2 pgs.

Dinaburg, Artem, et al., "Ether: Malware Analysis via Hardware Virtualization Extensions", CCS '08, Oct. 27-31, 2008, 12 pgs.

"Ether: Malware Analysis via Hardware Virtualization Extensions", [retrieved Oct. 28, 2014]. Retrieved from Internet: <URL: http://ether.gtisc.gatech.edu/source.html>, 7 pgs.

"The Volatility Framework", [retrieved Oct. 28, 2014]. Retrieved from Internet: <URL: http://code.google.com/p/volatility>, 2 pgs.

* cited by examiner

VIRTUAL MACHINE INTROSPECTION FACILITIES

BACKGROUND

In an environment in which one or more virtual machines execute, it may be desired for various reasons to monitor the activities of those virtual machine(s). An approach for monitoring such activities is virtual machine introspection. Virtual machine introspection provides a way to monitor a virtual machine from an outside, and typically more privileged, perspective. It does not require a separate agent to be installed in the VM and, when implemented well, results in minimal performance impact to the VM and the rest of the system.

BRIEF DESCRIPTION OF THE DRAWINGS

One or more aspects of the present invention are particularly pointed out and distinctly claimed as examples in the claims at the conclusion of the specification. The foregoing and other objects, features, and advantages of aspects of the invention are apparent from the following detailed description taken in conjunction with the accompanying drawings in which:

DETAILED DESCRIPTION

Described herein are facilities for analysis of software behavior through virtual machine (VM) introspection, providing, in one example, a robust virtual machine introspection application programming interface (API). VM introspection is the process of examining memory contents of a running VM. By applying knowledge of the guest VM's operating system, introspection can be used for a variety of applications, including reverse engineering of malware, debugging software, and securing a guest VM, among other applications. In some examples, aspects described herein can be used to monitor many simultaneously executing VMs, each generating possibly thousands of distinct software behaviors each second on commodity hardware.

An architecture to support features described herein incorporates, in one example, a modified version of the Xen® hypervisor (a hypervisor may also be referred to as a virtual machine monitor) to collect data that can be used to extract and reconstruct software behavior (Xen® is a registered trademark of Citrix Systems, Inc., Fort Lauderdale, Fla.). Xen® is a hypervisor that is loaded directly from a machine's boot loader when the machine is powered on. Xen® is able to simultaneously manage multiple VMs. It launches a special "privileged" guest VM referred to as Dom0. Dom0 is a paravirtualized guest, meaning it is aware of the Xen® hypervisor and interacts with it to manage system resources. From Dom0, users can launch additional, unprivileged VMs, which are referred to as DomU machines. A DomU VM can be a paravirtualized (pv) guest, requiring special support for the hypervisor, or a hardware virtual machine (hvm) guest, using special processor instructions to support virtualization. Intel® and AMD® both provide their own VM extensions (Intel® is a registered trademark of Intel Corporation, Santa Clara, Calif.; AMD® is a registered trademark of Advanced Micro Devices, Inc., Sunnyvale, Calif.).

Aspects described herein may be embodied in software referred to collectively herein as IntroVirt, a virtual machine introspection facility. The facility may function on various system architectures incorporating different types of processors, such as Intel® and AMD® processors, though uses in connection with additional architectures and processor types are possible.

Aspects of an architecture described herein are built, in one example, around primary software components that include: the hypervisor, operating-system-specific introspection libraries, an interface library between the introspection libraries and the hypervisor, and tools that leverage functionality provided by the previous three components. The introspection libraries may incorporate operating-system-specific semantic parsers built on top of the interface library. The interface library may handle management of the introspection that occurs. The architecture may execute as part of a system provided herein, depicted and described with reference to FIG. 1.

Figure 1:
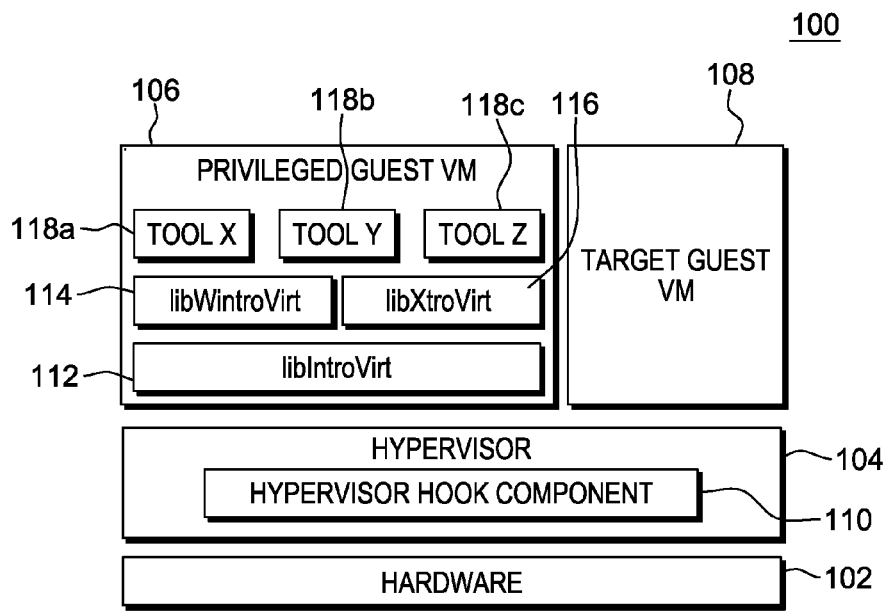
FIG. 1 depicts one example of a system in accordance with aspects described herein.

FIG. 1 depicts a system 100 having physical hardware 102 (CPUs, memory, I/O devices, etc.) 'owned' by hypervisor 104 and dispatched by hypervisor 104 to guest systems (virtual machines in this example). In FIG. 1, two guest virtual machines 106 and 108 execute above hypervisor 104. VM 106 is a privileged guest VM. In one example, hypervisor 104 is a modified version of the Xen® hypervisor, and privileged guest VM 106 is a paravirtualized guest machine known as Dom0. The other virtual machine in FIG. 1, VM 108, is the VM for which VM introspection described herein is being provided (also referred to as the "target guest virtual machine"). It should be understood that in other embodiments, VM introspection described herein is provided for several virtual machines—possibly tens or even hundreds—simultaneously executing above a hypervisor such as hypervisor 104.

Hypervisor 104 may be a modified version of the commercially available open source Xen® hypervisor and, in one example, the modifications may be intentionally designed to be minimal and unobtrusive, including, for instance, only a hypervisor hook component 110 inserted into the open source Xen® hypervisor code. Minimal modifications to the hypervisor may be important from security, maintenance, and/or open source licensing perspectives. Additionally, minimizing the changes to the hypervisor may facilitate keeping pace with the hypervisor's open source tree, with minimal overhead when incorporating a new hypervisor build into an existing installation of the architecture.

By keeping some/all code changes external to the hypervisor and instead within the proprietary IntroVirt framework, the effects of updates to the hypervisor are lessened, and debugging code is much easier. For instance, a bug in the hypervisor may require that the machine be rebooted each time a fix is tested, in order to load the patched hypervisor. In addition, the code separation approach noted above facilitates easier porting of IntroVirt hooks into other hypervisors, since the bulk of the hooking functionality is part of the IntroVirt code rather than the hypervisor code.

Privileged guest VM 106 includes several libraries 112, 114, and 116, and various tools 118a-118c which are part of the application layer of privileged guest VM 106.

One library, libIntroVirt 112, is an interface library providing communication facilities for interaction between privileged guest VM 106 and hypervisor 104. In one embodiment, libIntroVirt 112 is guest-operating-system agnostic, and interfaces higher-level introspection libraries (e.g. libraries 114, 116) with hypervisor 104, enabling them to communicate with each other. LibIntroVirt 112 provides an abstraction layer for the hypervisor in a hypervisor-agnostic fashion and allows introspection tools to be developed that can run on multiple different hypervisors. The libIntroVirt interface library 112 provides, in one example, the application layer between tools 118, the library stack (introspection libraries), and hypervisor 104. This design enables the framework described herein to be flexible in terms of the specific hypervisor used, requiring only minimal changes when changes are made to the underlying hypervisor, or when the hypervisor is replaced altogether.

LibWintroVirt 114 and libXtroVirt 116 are libraries providing introspection features specifically tailored for a respective operating system. These introspection libraries 114, 116 make use of libIntroVirt 112 by leveraging and extending its functionality to allow tools to examine the environment of guest VMs. In the example of FIG. 1, an operating system of target guest VM 108 is a Windows®-based operating system offered by Microsoft Corporation, Redmond, Wash. Accordingly, libWintroVirt 114 has the ability to parse several Windows®-based operating system kernel objects, such as the OBJECT_ATTRIBUTES, EPROCESS, ETHREAD, and PE (Portable Executable) file format structures. Similarly, libXtroVirt 116 includes operating-system-specific parsing libraries for introspective capabilities for another operating system, other than a Windows®-based operating system, such as a Linux-based operating system.

In one example, tools may be developed to perform introspection tasks using introspection libraries 114 and 116 absent requiring the developer to learn low-level details of how the target guest VM operating system(s) are implemented. As noted above, tools 118a-118c are included in the application layer of privileged guest VM 106. Tools 118 are specific implementations of the introspective tools that are enabled by the architecture. Example tools and capabilities thereof are described below. In general, a tool utilizes data structure parsers of an appropriate introspection library, such as libWintroVirt or libXtroVirt. An example such data structure parser can parse system calls intercepted and passed to the privileged guest for handling. In some examples, the parsers can extract information about the target guest VM and/or about an intercepted introspection event itself. However, in some examples, a tool implements its own parser(s) when, for example, parsers for a particular system call or data structure do not exist in an introspection library like libWintroVirt. Generally, however, the desired parser could be placed in one of the introspection libraries (e.g. libWintroVirt, libXtroVirt) so that any tool could use the parser(s) for that data structure.

Some aspects described herein, such as system call hooking and system call return hooking, are presented in the context of target guest VMs running Windows®-based operating systems and executing on Intel® architecture-based systems. However, it should be understood that aspects described herein are not limited to target guest VMs running Windows®-based operating systems and executing on Intel®-based system architectures; aspects described herein are applicable to other target guest virtual machine operating systems running on other system architectures.

System Call Hooking:

Continuing with the description of FIG. 1, hypervisor hook component 110 of hypervisor 104 monitors for introspection events that may be of interest to underlying tools of the privileged guest VM, such as system calls made to the kernel of a target guest VM by non-kernel (userland) software running on that target guest VM. Userland software is distinguished from kernel-level software and refers generally to non-kernel code. On some architectures that use a ring-based model for privilege execution, userland code is code running in "ring 3".

System calls are used extensively by software for tasks such as opening files and registry keys, and reading, writing, and launching processes, among other activities. By monitoring system calls initiated by an application, it is possible to observe the application's interactions with the operating system API.

Introspection events may be, in accordance with aspects described herein, intercepted (hooked) by hooking facilities that can be selectively enabled and/or disabled. In one example, this selective enablement/disablement is per-VM, based on virtual machine context switching occurring via a control register (e.g. CR3) write. Then, after an introspection event is intercepted, the hypervisor can determine whether that particular event is of interest for introspection purposes to component(s) of the privileged guest VM. In this manner, some introspection events may be of interest to the privileged guest VM (or component thereof), and some may not, and therefore the hypervisor can determine whether or not the privileged guest VM (or component thereof) should be notified that the particular event occurred and/or be provided with information associated with that event, as described in further detail below.

Figure 2:
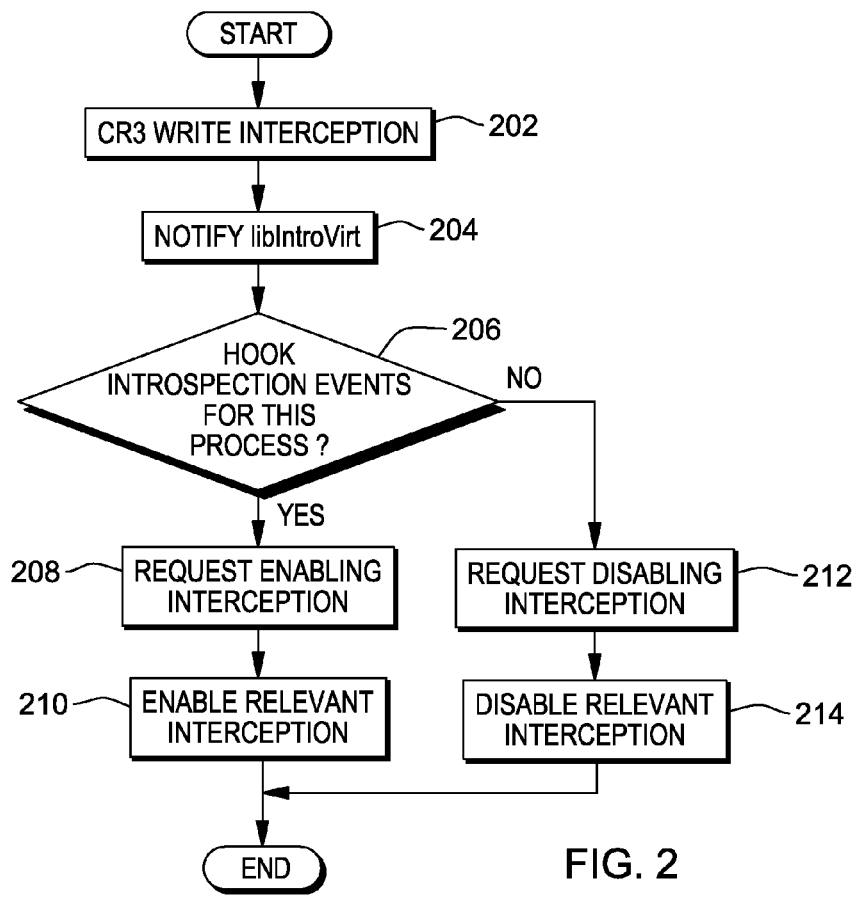
FIG. 2 depicts an example process for selectively enabling/disabling introspection event interception facilities, in accordance with aspects described herein.

FIG. 2 depicts an example process for selectively enabling/disabling introspection event interception facilities based on virtual machine context switching, in accordance with aspects described herein. In one example, the process is initiated when a guest operating system attempts to update (i.e. write to) the CR3 control register. The process of FIG. 2 can be used to enable selective interception of any event, including, but not limited to, system calls.

Referring to FIG. 2, the process begins with interception of the CR3 write attempt (202). A CR3 write attempt signifies that a guest VM is performing a context switch on one of its Virtual CPUs (VCPUs). In one example, the CR3 write attempt is intercepted by hypervisor hook component (e.g. FIG. 1, #110). LibIntroVirt, the interface library (e.g. FIG. 1, #116), is then notified (204), e.g. by the hypervisor hook component, of the intercepted CR3 write so that a determination can be made by libIntroVirt as to whether interception of introspection event(s) for the guest VM being switched-to is to be enabled.

LibIntroVirt provides functionality for underlying application(s), such as an underlying tool (118, FIG. 1), to indicate whether to intercept introspection events for the process to which context is being switched (206). In some examples, a tool can call a function (such as setCR3Hooking (true), or setSystemCallHooking(true), as examples) provided by libIntroVirt to enable such interception. Different types of introspection events may be intercepted, as described further below. If introspection events are to be intercepted, libIntroVirt requests enablement of such interception (208). This request is made, in one example, to the hypervisor, which is to perform the introspection event interception. The hypervisor enables relevant introspection event interception (210), if not already enabled. Examples of this enabling are described and depicted with reference to FIGS. 3A, 4A, and 5A.

Alternatively, if at (206) it is determined that introspection events are not to be intercepted, libIntroVirt requests disabling such interception (212). This request is made, in one example, to the hypervisor, and the hypervisor disables relevant introspection event interception (214), if not already disabled. Examples of this disabling are described and depicted with reference to FIGS. 3B, 4B, and 5B.

One set of introspection events that can be intercepted are SYSENTER and SYSEXIT instructions. SYSENTER and SYSEXIT are Intel®'s fast system call instructions. These instructions are supported on Intel® processors in both 32-bit mode and 64-bit mode. AMD® architectures support these instructions on 64-bit processors running in 32-bit compatibility mode.

Figure 3A:
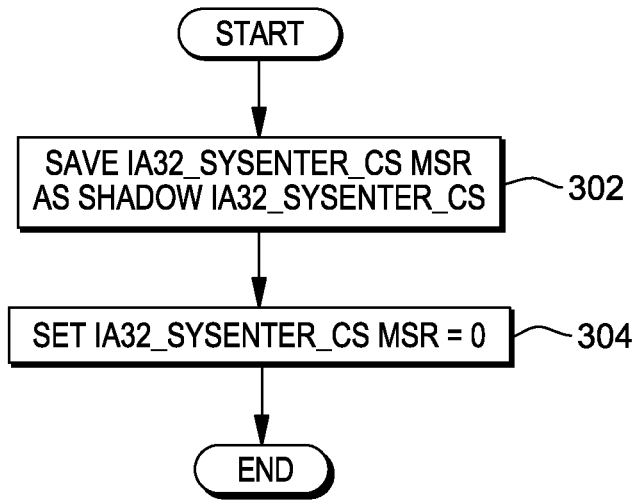
FIG. 3A depicts an example process for enabling SYSENTER/SYSEXIT instruction interception, in accordance with aspects described herein.

FIG. 3A depicts an example process for enabling SYSENTER/SYSEXIT instruction interception, in accordance with aspects described herein. In one example, this process is performed by the hypervisor based on a request from libIntroVirt that SYSENTER/SYSEXIT instruction interception is to be performed. LibIntroVirt may make such a request based on a tool of the privileged guest VM indicating that it is interested in information associated with the occurrence of one or more SYSENTER and/or SYSEXIT instructions. It may be the case that, when a SYSENTER/SYSEXIT instruction is attempted by a target guest VM, a tool desires to obtain information about the target guest VM, its processing context, or the SYSENTER/SYSEXIT instruction itself, as examples. Performing the enabling of FIG. 3A will cause a #GP exception to be raised when a SYSENTER/SYSEXIT call is made. The hypervisor will recognize that #GP exception as significant of an introspection event, and perform processing to determine whether to pass information about the event down to the target guest VM (described below with reference to FIG. 7).

The SYSENTER and SYSEXIT instructions cause a General Protection Fault (#GP) if the IA32_SYSENTER_CS Model-specific Register (MSR) is set to 0. Accordingly, to cause the #GP exception to be generated each time a SYSENTER or SYSEXIT instruction is executed, thereby enabling SYSENTER/SYSEXIT instruction interception, the IA32_SYSENTER_CS MSR may be force-set to 0. Before doing this, however, the hypervisor saves the current IA32_SYSENTER_CS MSR as a 'shadow' IA32_SYSENTER_CS (302), and then proceeds to set IA32_SYSENTER_CS MSR equal to 0 (304). The shadow IA32_SYSENTER_CS is maintained so that a guest request to read or write that value can be accurately handled. Further details of this handling of a guest read/write attempt are provided below with reference to FIGS. 12A and 12B.

Figure 3B:
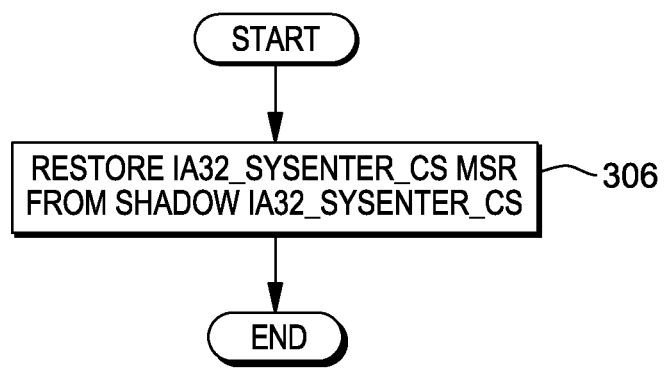
FIG. 3B depicts an example process for disabling SYSENTER/SYSEXIT instruction interception, in accordance with aspects described herein.

FIG. 3B depicts an example process for disabling SYSENTER/SYSEXIT instruction interception, in accordance with aspects described herein. In one example, this is performed by the hypervisor based on libIntroVirt requesting that SYSENTER/SYSEXIT instruction interception be disabled (FIG. 2, #212). The process restores IA32_SYSENTER_CS MSR from the shadow IA32_SYSENTER_CS (306), i.e. by copying the value of shadow IA32_SYSENTER_CS to the IA32_SYSENTER_CS MSR, and then the process ends. The process restores normal functionality to handling of SYSENTER and SYSEXIT instructions.

In some examples, step (306) is performed only if no other introspection events that would raise a #GP exception are to be hooked. For instance, as described below, an introspection event to be intercepted may be the INT/IRET instruction, for instance if one or more tools of the privileged guest VM are interested in one or more types of INTs or IRETs being executed. Execution of an INT/IRET can also be caused to raise a #GP exception under certain situations. In this case, if SYSENTER/SYSEXIT instruction interception is no longer desired but INT/IRET instruction interception is desired, then the restore of the IA32_SYSENTER_CS MSR from the shadow IA32_SYSENTER_CS (306) to disable #GP exception interception will not be performed, so that #GP interception continues for intercepting INT/IRET introspection events. Accordingly, the hypervisor may maintain indications as to which types of event interception are to be enabled/disabled, and may perform the enabling/disabling when appropriate.

Another set of introspection events that can be hooked are SYSCALL and SYSRET instructions. SYSCALL and SYSRET are AMD®'s fast system call instructions, and are supported on both AMD® and Intel® processors in 64-bit mode.

Figure 4A:
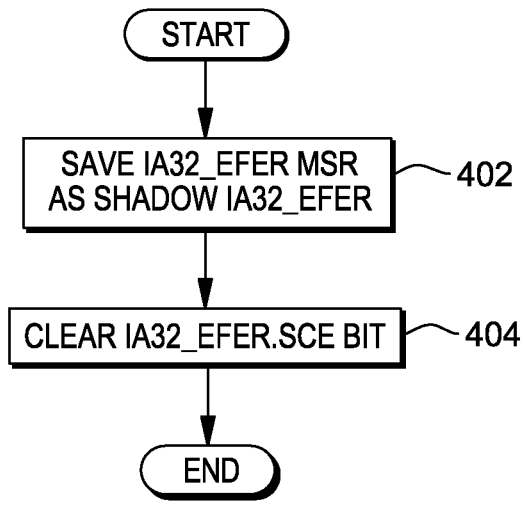
FIG. 4A depicts an example process for enabling SYSCALL/SYSRET instruction interception, in accordance with aspects described herein.

FIG. 4A depicts an example process for enabling SYSCALL/SYSRET instruction interception, in accordance with aspects described herein. In one example, this process is performed by the hypervisor based on determining that SYSCALL/SYSRET instruction interception is to be performed. This enabling will provide for notification to the hypervisor when a #UD exception raised on a SYSCALL/SYSRET call, for further processing described below with reference to FIG. 10.

The SYSCALL and SYSRET instructions cause an Undefined Opcode fault (#UD) if the System Call Extension (SCE) bit is cleared in the Extended Feature Enable Register (EFER) MSR. Accordingly, to cause the #UD exception to be generated each time a SYSCALL or SYSRET instruction is executed, thereby enabling SYSCALL/SYSRET instruction interception, the IA32_EFER.SCE bit may be cleared. Similar to above in FIG. 3A, the IA32_EFER MSR is maintained as a shadow IA32_EFER so that a guest request to read or write that value can be accurately handled, the details of which are provided below with reference to FIGS. 13A and 13B. Thus, in FIG. 4A, the IA32_EFER MSR is first saved as a shadow IA32_EFER (402), and then the SCE bit in the IA32_EFER MSR is cleared (404) to cause SYSCALL and SYSRET instructions to generate the #UD exception each time the SYSCALL or SYSRET instruction is executed.

Figure 4B:
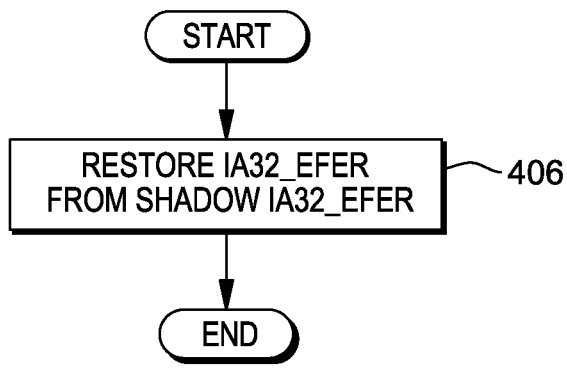
FIG. 4B depicts an example process for disabling SYSCALL/SYSRET instruction interception, in accordance with aspects described herein.

FIG. 4B depicts an example process for disabling SYSCALL/SYSRET instruction interception, in accordance with aspects described herein. In one example, this is performed by the hypervisor based on libIntroVirt requesting that SYSCALL/SYSRET instruction interception be disabled (FIG. 2, #212). The process restores the IA32_EFER from the shadow IA32_EFER (406), i.e. by copying the value of shadow IA32_EFER to the IA32_EFER MSR, and then the process ends. The process restores normal functionality to handling of SYSCALL and SYSRET instructions. Similar to FIG. 3B, in some examples, step (406) is performed only if no other introspection events that would raise a #UD exception are of interest.

In this example, the shadow value that is stored is the entire value of IA32_EFER MSR, even though it may be the case that only the SCE bit is of interest for purposes of forcing the #UD exception on a SYSCALL/SYSRET instruction. This approach where the shadow being maintained is the entire IA32_EFER MSR value may be simpler than an alternative approach that first checks the SCE bit in the IA32_EFER MSR and then stores only that bit value.

When the shadow value is needed based on a guest attempting to read the value of IA32_EFER.SCE bit value (see below with reference to FIG. 13B), it may be simpler to return an entire value for IA32_EFER rather than the alternative approach of performing an OR operation of that entire value to obtain the value of the SCE bit. Thus, storing/restoring a shadow that is a value for the entire IA32_EFER may be easier or more desirable than storing/restoring a single bit, although both approaches are possible and would accomplish the same objective.

Yet another set of introspection events that can be intercepted are INT (which generates the standard software interrupt) and IRET (which returns to the interrupted routine) instructions. Various methods can be used to cause these instructions to trigger a #GP fault.

Figure 5A:
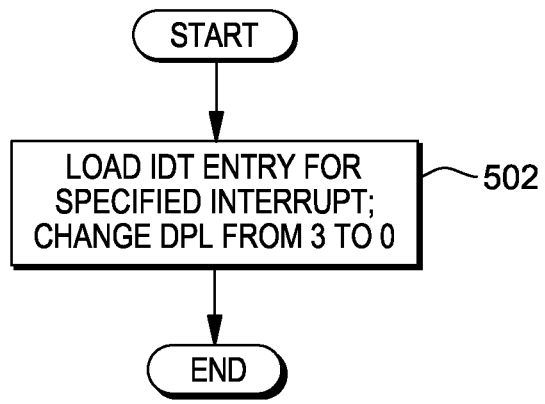
FIG. 5A depicts an example process for enabling INT/IRET instruction interception, in accordance with aspects described herein.

One such method is presented in FIG. 5A, which depicts one example process for enabling INT/IRET instruction interception, in accordance with aspects described herein. In one example, the process is performed by the hypervisor based on libIntroVirt requesting system call hooking and specifying the system call interrupt number (in which further handling of the intercepted instruction is enabled for only INT/IRET instructions having the specified interrupt number). The particular system call interrupt numbers to be hooked may be specified by one or more tools, or by an introspection library. For example, the libWintroVirt library could indicate that the system call interrupt for Windows®-based operating systems is 0x2e and could request that libIntroVirt request system call hooking for interrupt number 0x2e.

The process includes loading the Interrupt Descriptor Table (IDT) entry for the specified interrupt number, and changing the entry's Descriptor Privilege Level (DPL) (502), e.g. from 3 to 0. This changes the privilege level (protection ring level) at which a component must be executing in order to be allowed to use the specified interrupt. Changing from 3 to 0 indicates that userland software (operating at ring 3 in this example) is no longer allowed to use the specified interrupt; the software must be executing at ring 0 (i.e. kernel level). Thus, when the interrupt descriptor's privilege level is set to 0, ring 3 applications, for instance, do not have permission to call the interrupt, and a #GP exception will be raised.

Figure 5B:
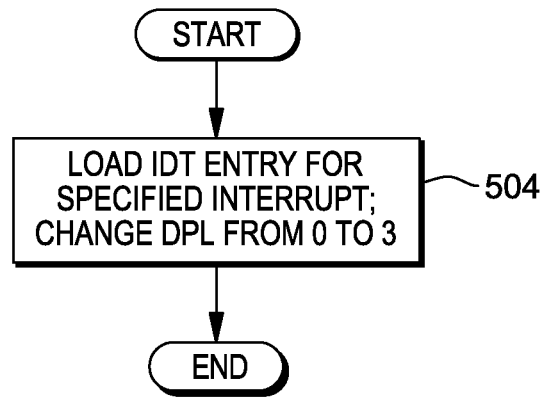
FIG. 5B depicts an example process for disabling INT/IRET instruction interception, in accordance with aspects described herein.

FIG. 5B depicts an example process for disabling INT/IRET instruction interception, in accordance with aspects described herein. The process repairs the specified interrupt descriptor so that it no longer generates a #GP fault. The process begins by reversing the privilege change above; i.e. loading the IDT entry for the specified interrupt and changing the entry's DPL from 0 to 3 (504). Similar to the earlier cases with SYSENTER/SYSEXIT instructions, step (504) may or may not need to be performed, depending on whether #GP exceptions caused by way of the DPL change are of interest for other reasons.

The above are example methods for causing a #GP fault to intercept interrupts (INTs), but other approaches are available for intercepting interrupts. AMD®, for instance, provides a facility that would allow hooking INT/IRET directly. Other approaches could involve debug breakpoints (INT 3), shadow paging faults, or Extended Page Table violations (on an Intel® architecture), as examples. Further approaches are possible.

SYSENTER/SYSEXIT, SYSCALL/SYSRET, and INT/IRET instructions are just some examples of introspection events that may be of interest for interception. Other types of introspection events may be of interest. In those cases, interception of the desired events can be effected by setting/ modifying/adjusting any appropriate facilities to cause occurrence of the event to raise an exception or other type of notification.

Figure 6:
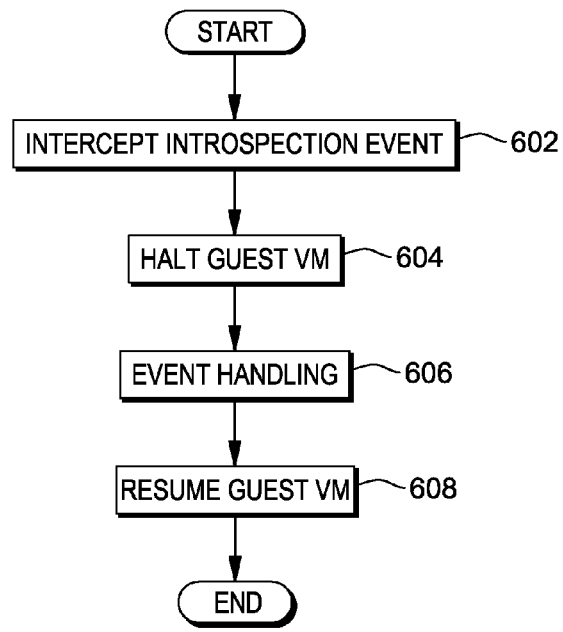
FIG. 6 depicts an example process for handling an introspection event, in accordance with aspects described herein.

When an introspection event is intercepted, the event is handled at least in part by the hypervisor, and may be further handled by one or more libraries or tools running within a privileged guest VM (e.g. Dom0 described above). FIG. 6 depicts an example process for handling an introspection event, in accordance with aspects described herein. The process begins with a hypervisor hook component (e.g. 110 of hypervisor 104 in FIG. 1) capturing an introspection event (602), such as a system call made by a target guest VM. In the examples above, the event is intercepted based on the raising of an exception based on the attempted execution of an instruction. In one example, the exception is a #GP or #UD exception recognized by the hypervisor hook component. The target guest VM is then halted (604), for instance by suspending the VCPU(s) dedicated to the target guest VM to suspend execution of the target guest machine. Event handling is then performed (606) by the hypervisor, libraries, and/or tools of a privileged guest virtual machine. In some specific examples described in further detail below, hypervisor 104 notifies privileged guest VM 106 (e.g. Dom0) by way of an Event Channel that a system call or a system call return was just intercepted. Software in privileged guest VM 106, such as a tool 118 thereof may receive information about the event and examine the current state of the target guest VM, determining the system call number, arguments, and information about which process is making the call, for instance. Various other behaviors in response to an event are possible.

Handling of an introspection event can involve different actions depending on the event that occurred. For instance, if the introspection event is a system call but not any type of system call that is of interest to any of the privileged guest VM tools, the hypervisor may determine that the target guest VM is to be resumed without alerting the privileged guest machine (or requesting component thereof) of the introspection event. In other examples, the hypervisor provides particular information down to the privileged guest VM for further handling of the event. Examples of event handling are described below with reference to FIGS. 7-13B. In any case, after event handling (606), control is returned to the target guest VM by resuming the guest VM (608). In one example, privileged guest VM 106 directs hypervisor 104 to resume the VCPU of the target guest VM (to resume execution of the guest VM) that made the call, and the target guest VM continues its execution. The target guest VM may have no knowledge of the system call monitoring, unless, for instance, an intentional change was made while the target guest VM was halted.

Event handling need not necessarily pause the VCPU of the target guest VM for every event. For instance, asynchronous event handling support may be available, in which an event is intercepted and handled absent halting the target guest VM. Additionally or alternatively, a guest VM may be halted initially but resumed (by resuming is VCPU(s)) sometime concurrent to the event handling, rather than waiting until event handling concludes (i.e. step 608 may be performed during performance of step 606 in FIG. 6).

Figure 7:
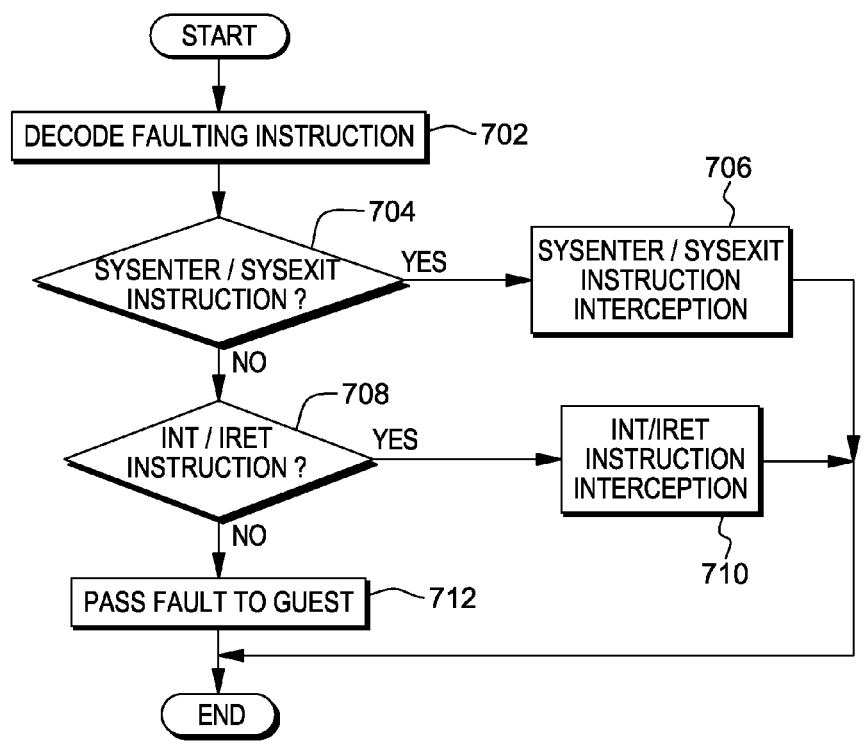
FIG. 7 depicts an example process for general protection fault handling, in accordance with aspects described herein.

Examples of event handling (FIG. 6, #606) are now described. In one example, a general protection fault is raised, for instance when a SYSENTER, SYSEXIT, INT, or IRET instruction is the introspection event being intercepted. FIG. 7 depicts an example process for general protection fault handling, in accordance with aspects described herein. In one example, the process of FIG. 7 is performed by a hypervisor or component thereof upon recognizing a #GP exception.

The process begins by decoding the faulting instruction (702). Decoding the instruction enables the hypervisor to determine the cause of the exception. If the cause of the exception is an introspection event in which the hypervisor (or privileged guest virtual machine) is interested, then an appropriate routine may be invoked. Thus, using the example introspection events described above, the hypervisor determines whether the cause was a SYSENTER/SYSEXIT instruction (704). If so, the hypervisor invokes a routine for SYSENTER/SYSEXIT instruction interception event handling (706), described below with reference to FIG. 8. Otherwise, the hypervisor determines whether the cause was an INT/IRET instruction (708). If so, the hypervisor invokes a routine for INT/IRET instruction interception event handling (710), described below with reference to FIG. 9.

If the cause of the exception was neither of the above, then the fault is passed to the target guest VM (712), and the event handling ends. As described above in connection with FIG. 6, when event handling ends, the guest may be resumed, pick up the exception, and handle the exception as if no #GP exception interception by the hypervisor occurred. Accordingly, the hypervisor may perform necessary patch-up so that the target guest VM is unaware that the instruction faulted.

The process of FIG. 7 includes checks for SYSENTER/SYSEXIT and INT/IRET introspection events, since these are the types of interception events described herein that can be caused to raise a #GP fault. However, it is to be understood that the process of FIG. 7 for #GP fault handling would more generally include check(s) for any type of introspection event (i) that was enabled for interception (as seen in FIGS. 3A, 5A) and (ii) for which #GP fault is raised.

Figure 8:
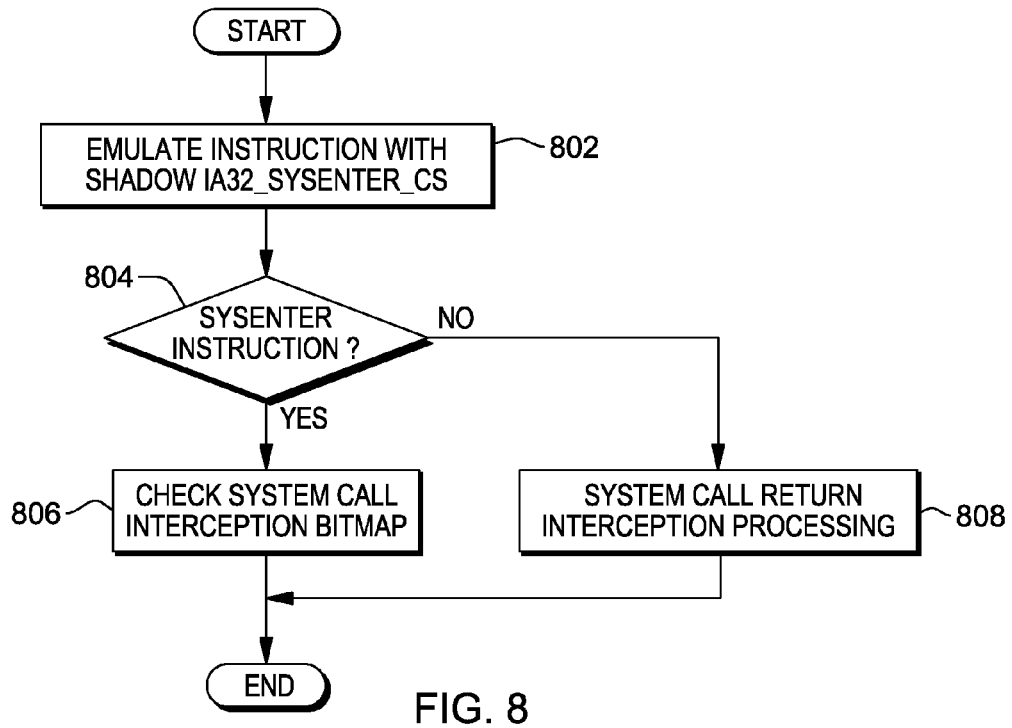
FIG. 8 depicts an example process for handling a SYSENTER/SYSEXIT instruction interception event, in accordance with aspects described herein.

Under the process of FIG. 7, the #GP fault is caused either by SYSENTER/SYSEXIT introspection event (i.e. SYSENTER/SYSEXIT instruction interception), or INT/IRET introspection event (i.e. INT/IRET instruction interception), and appropriate handling of each type of instruction interception is performed. FIG. 8 depicts an example process for handling a SYSENTER/SYSEXIT instruction interception event, in accordance with aspects described herein. This process is performed, in one example, by the hypervisor or component thereof.

The process begins by emulating the SYSENTER or SYSEXIT instruction with the shadow IA32_SYSENTER_CS (802) that was saved previously when SYSENTER/SYSEXIT instruction interception was enabled (FIG. 3A, #304). The instruction is emulated, in one example, in a manner that produces the same effect as the hardware would have produced, resulting in a transition to kernel code. The emulation function uses the shadow copy of IA32_SYSENTER_CS so that the instruction is properly emulated. While the emulation may not be absolutely required, allowing the hardware to take the action may be more complicated in some examples. Without emulation, it may be necessary for the hypervisor to repair the actual MSR, enable single stepping, resume the guest, catch the step, and re-hook the MSR to 0, for instance, adding significant overhead in some cases.

Next, it is determined whether the instruction is a SYSENTER instruction (804), for instance by examining the memory/instruction pointed to by the guest's instruction pointer (EIP), and checking the byte(s) in order to determine if the faulting instruction is one that is of interest (SYSENTER in this example). If the instruction is a SYSENTER instruction, then a system call interception bitmap is checked (806). This checking is described below with reference to FIG. 14 and involves checking to determine whether this particular system call is, or may be, of interest to a component of the privileged guest VM, and whether to hook a return corresponding to the system call.

Continuing with FIG. 8, if at (804) it is determined that the instruction is not a SYSENTER instruction, then by deduction (in these examples), it is a SYSEXIT instruction, in which case the process continues by invoking system call return interception processing (808). Facilities are provided herein that enable the privileged guest VM or component thereof (i.e. libIntroVirt) to register to be notified when a system call return is to be intercepted, by hooking such return (this hooking is described below with reference to FIG. 15). The system call return interception processing (808) will check to determine whether to notify the privileged guest VM (or component thereof) upon interception of the system call return (SYSEXIT). Further details of the system call return interception processing is described below with reference to FIG. 17. In one example, each SYSEXIT is caught, and a check is performed (see FIG. 17) to determine whether libIntroVirt is to be notified of that particular SYSEXIT.

Figure 9:
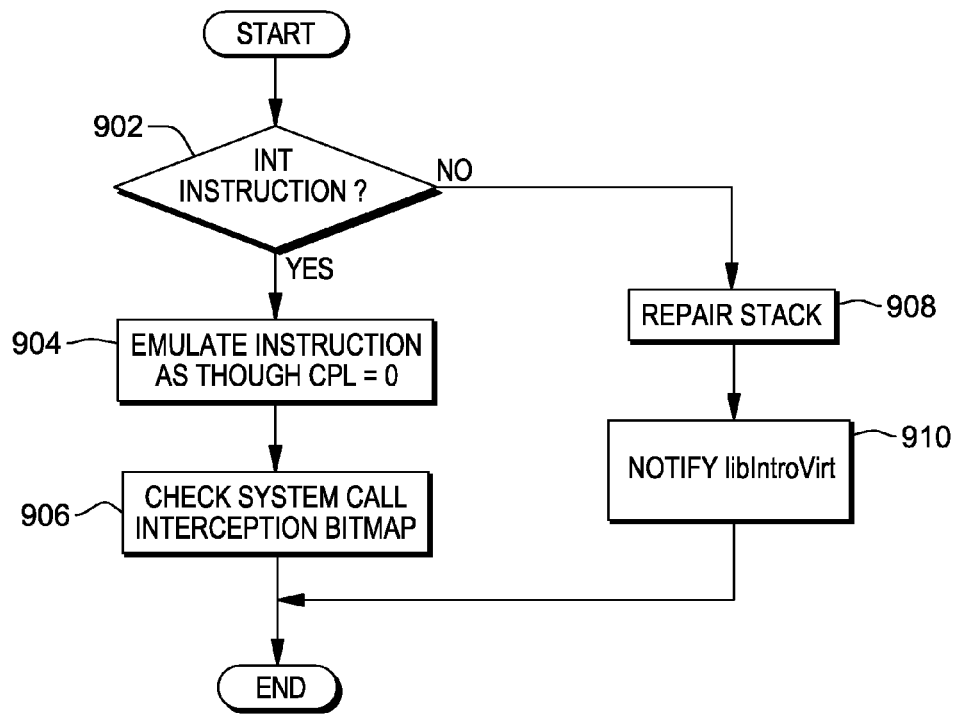
FIG. 9 depicts an example process for handling an INT/IRET instruction interception event, in accordance with aspects described herein.

FIG. 9 depicts an example process for handling an INT/IRET instruction interception event, in accordance with aspects described herein. This process is performed, in one example, by the hypervisor or a component thereof.

Figure 16:
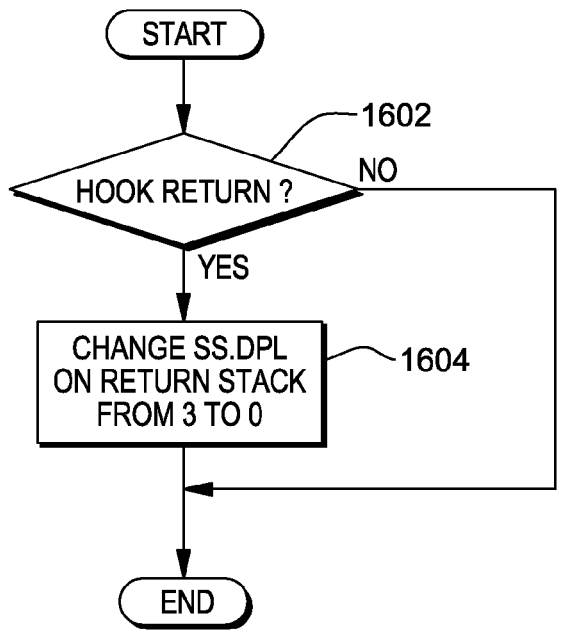
FIG. 16 depicts an example process for adding an IRET instruction return hook, in accordance with aspects described herein.

The process begins by determining whether the instruction is an INT instruction (902). If so, the instruction is emulated (904), e.g. as though the current privilege level (CPL)=0 for the software process triggering the INT. The DPL for the corresponding IDT entry was set to 0 (by FIG. 5B, #506), and the CPL for the software process triggering the INT is actually something greater, such as 3 if the process is running in ring 3. Accordingly, the INT instruction may be emulated as if the privilege level of the process is 0 instead of 3. The INT instruction is emulated, in one embodiment, as it would have been executed in the hardware. Manuals of the Intel®/AMD® architectures describe the instruction. Changes made to the guest may be ones that the INT instruction would have performed (for instance, instruction pointer moved, stack pointer changed, etc., as examples). If the return is to be hooked, however, the stack parameters may be altered so that the corresponding IRET will cause a #GP fault (FIG. 16).

After emulating the instruction, the process then continues to check the system call interception bitmap (906) (FIG. 14) to determine whether this particular system call is, or may be, of interest to a component of the privileged guest VM, and whether to hook a return corresponding to the system call.

If at (902), it was determined that the instruction is not an INT instruction, then by deduction (in these examples) it is an IRET instruction. Similar to the SYSEXIT interception above, facilities provided herein enable the privileged guest VM or component thereof (i.e. libIntroVirt) to be notified when an IRET corresponding to a particular INT is to be intercepted. Should the software decide to hook an IRET after, and corresponding to, a particular INT, the return stack can be modified in such a way that a #GP fault is generated for that specific IRET (when it occurs). In one particular example, a hook of the return is registered by changing a stack-segment (SS) DPL (SS.DPL) from 3 to 0 (described below in connection with FIG. 16). Other methods are also possible for generating a fault when the corresponding IRET is executed.

When an IRET is caught, a check (not shown in FIG. 9) can be made to determine whether stack modification is present, in order to determine whether the IRET was meant to be hooked; no outside check is necessary. In general, an IRET will not normally cause a fault unless, for instance, the SS.DPL was changed as above. In cases where the SS.DPL (or other mechanism to drive the #GP fault on an IRET) was not changed in accordance herein to drive the fault, then the process can exit, since the IRET was driven by some other reason (and may have the effect of crashing the guest).

Assuming that the IRET was driven by the SS.DPL modification above, the return stack may be repaired, then, by changing the SS.DPL back to 3 from 0 (908), and libIntroVirt may then be notified (910) that the return has been intercepted. LibIntroVirt might, for instance, pass that information to an underlying tool for handling the return. In one example, the hypervisor may pause the guest VCPU and notify libIntroVirt as to the cause—in this case a hooked IRET. In some embodiments, an introspection library such as libWintroVirt abstracts INT/IRET handlers and wraps them into generic "system call"/"system call return" events, regardless of the specific mechanism. In this regard, a system call can be made using either SYSCALL or SYSENTER instructions (which will generally use the same calling convention) or by an INT instruction (which has a different calling convention in Windows architecture). The introspection library (e.g. libWintroVirt) can correctly handle any format, providing the user with a common API regardless of how the call occurred. The same can be said for SYSRET/SYSEXIT/IRET.

Referring back to the event handling scenarios of FIG. 6 (#606), in one example, an undefined opcode fault is raised, for instance when SYSCALL and/or SYSRET instructions are the introspection event being intercepted.

Figure 10:
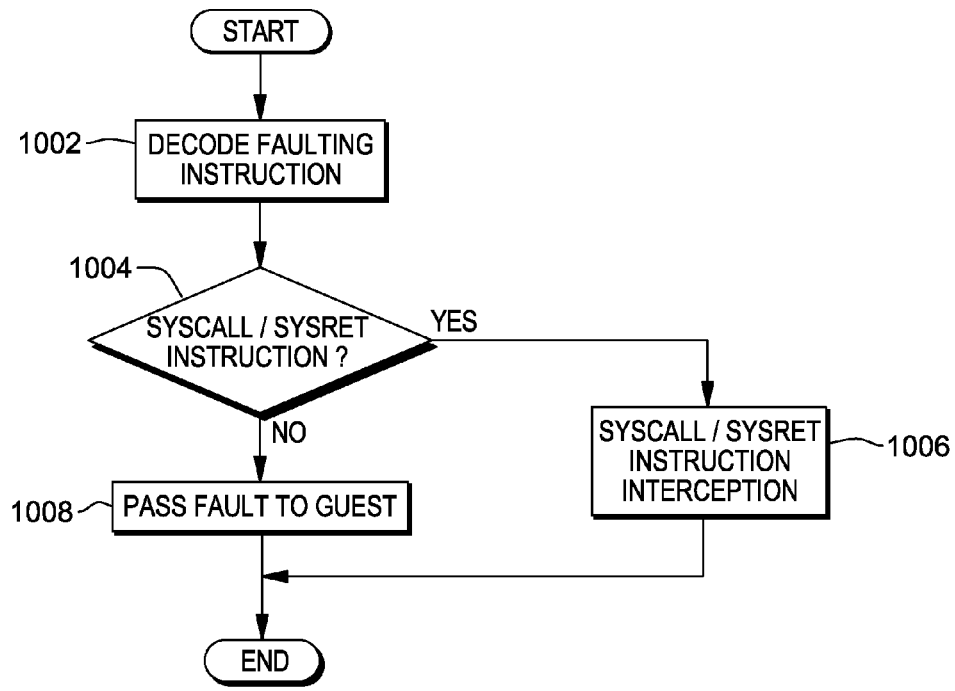
FIG. 10 depicts an example process for undefined opcode fault handling, in accordance with aspects described herein.

FIG. 10 depicts an example process for undefined opcode fault handling, in accordance with aspects described herein. In one example, the process of FIG. 10 is performed by a hypervisor or component thereof upon intercepting the #UD exception.

The process begins by decoding the faulting instruction (1002) to enable the hypervisor to determine the cause of the exception. If the cause of the exception is an introspection event in which the hypervisor (or privileged guest virtual machine) is interested, then an appropriate routine may be invoked. Thus, using the example introspection events described above in connection with the #UD exception, the hypervisor determines whether the cause was a SYSCALL/SYSRET instruction (1004). If so, the hypervisor invokes a routine for SYSCALL/SYSRET instruction interception event handling (1006), described below with reference to FIG. 11. Otherwise, the fault is passed to the target guest VM (1008), and the event handling ends. As described above in connection with FIG. 6, when event handling ends, the guest may be resumed and would pick up the exception and handle it as if no #UD exception interception occurred.

The process of FIG. 10 includes checks for SYSCALL/SYSRET introspection events, since these are the types of introspection events described herein that can be caused to raise a #UD fault. However, it is understood that the process of FIG. 10 would include a check for any other type of introspection event (i) that was enabled for interception (e.g. FIG. 4A) and (ii) for which a #UD fault is raised.

Figure 11:
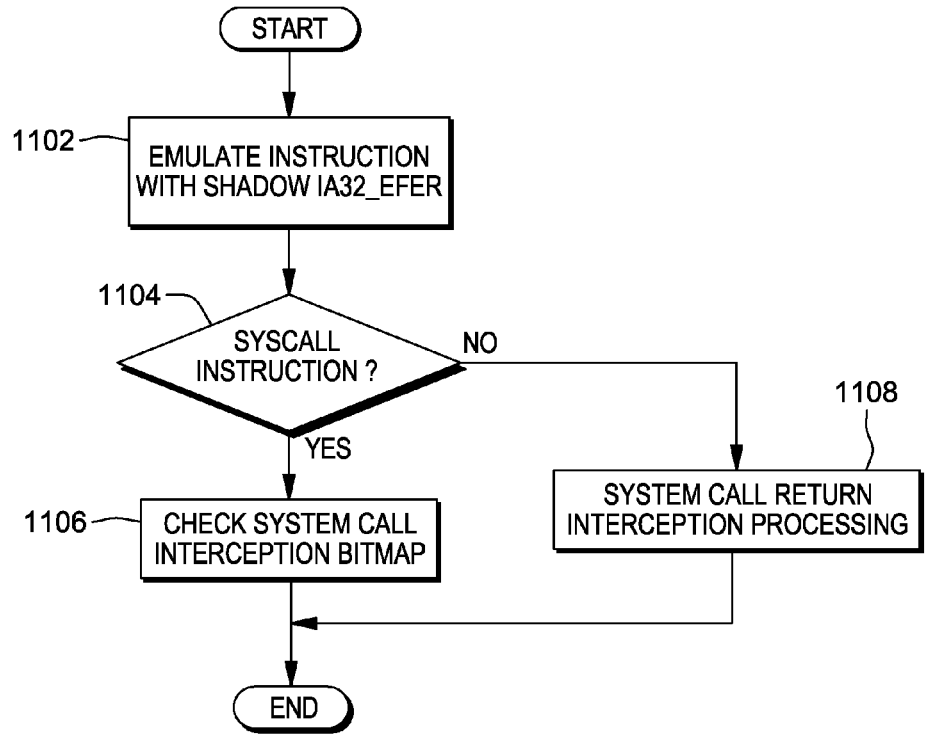
FIG. 11 depicts an example process for handling a SYSCALL/SYSRET instruction interception event, in accordance with aspects described herein.

FIG. 11 depicts an example process for handling a SYSCALL/SYSRET instruction interception event, in accordance with aspects described herein. This process is performed, in one example, by the hypervisor or component(s) thereof.

The process begins by emulating the SYSCALL or SYSRET instruction with the shadow IA32_EFER (1102) that was saved previously when SYSCALL/SYSRET instruction interception was enabled (FIG. 4A, #404). The emulation may be similar to what is described above, i.e. performing what the hardware would have done, for instance according to the Intel®/AMD® manuals, but using the "shadow" IA32_EFER rather than the actual IA32_EFER MSR in the hardware. The emulation is performed, in one example, so that the transition from user mode to kernel mode works properly. In one example, the SCE bit is used in the emulation.

Next, it is determined whether the instruction is a SYSCALL instruction (1104), for instance by analyzing the instruction pointed-to by the instruction pointer (EIP) of the faulting VCPU. If the instruction is a SYSCALL instruction, then the system call interception bitmap is checked (1106), as described below with reference to FIG. 14. As with SYSENTER instruction interception, selective enablement and disablement of specific system call hooking is provided, and this checking enables the privileged guest VM to selectively handle the introspection events (i.e. handle only those specific calls that are of interest), to reduce performance degradation from further handling of system calls that are not of interest to the privileged guest VM.

If the instruction is not a SYSCALL instruction, then by deduction it is a SYSRET instruction, in which case the process continues by invoking system call return interception processing (1108) for notifying of a SYSRET return. The SYSRET can be hooked as described below with reference to FIG. 15, and the system call return interception processing (as described with reference to FIG. 17) will check this and cause the privileged guest VM (or component thereof) to be notified upon interception of the system call return (SYSRET) if it was registered to be hooked.

In order to force the #GP or #UD exceptions for SYSENTER, SYSEXIT, SYSCALL, and SYSRET instruction interception, MSRs were manipulated in the examples above (see FIG. 3A, 4A). Since the guest machines may rely on and/or adjust MSR values from time to time, proper handling, by the hypervisor, of writes and reads by the guest machines to the adjusted MSRs may be necessary. The guest machine may simply use the normal x86 instruction set to read from or move a value to the specified MSR. Thus, in accordance with aspects described herein, if system call hooking is enabled, writes to the IA32_SYSENTER_CS and/or IA32_EFER MSRs (using the examples of FIGS. 3A and 4A) may be prevented from completing, to ensure that hooking remains enabled. In accordance with aspects described herein, the write may instead be directed to the shadow version of the corresponding register so that the adjustment being made by the guest machine is maintained. Similarly, reads from the MSRs may be directed to the shadow version of the corresponding register so that the target guest virtual machine is unaffected by the modifications to the actual MSRs that have been manipulated. These writes and reads are additional examples of introspection events that may be intercepted (FIG. 6, #602) and handled (FIG. 6, #606) by, e.g., a hypervisor in accordance with aspects described herein. Both the Intel® and AMD® virtualization extensions provide mechanisms for selectively enabling reads and/or writes to MSRs and control registers. Code can be added where the hypervisor normally receives these types of events. However, the guest's attempt to set a valid value in certain MSRs, or read from the MSRs, may be handled differently.

Figure 12A:
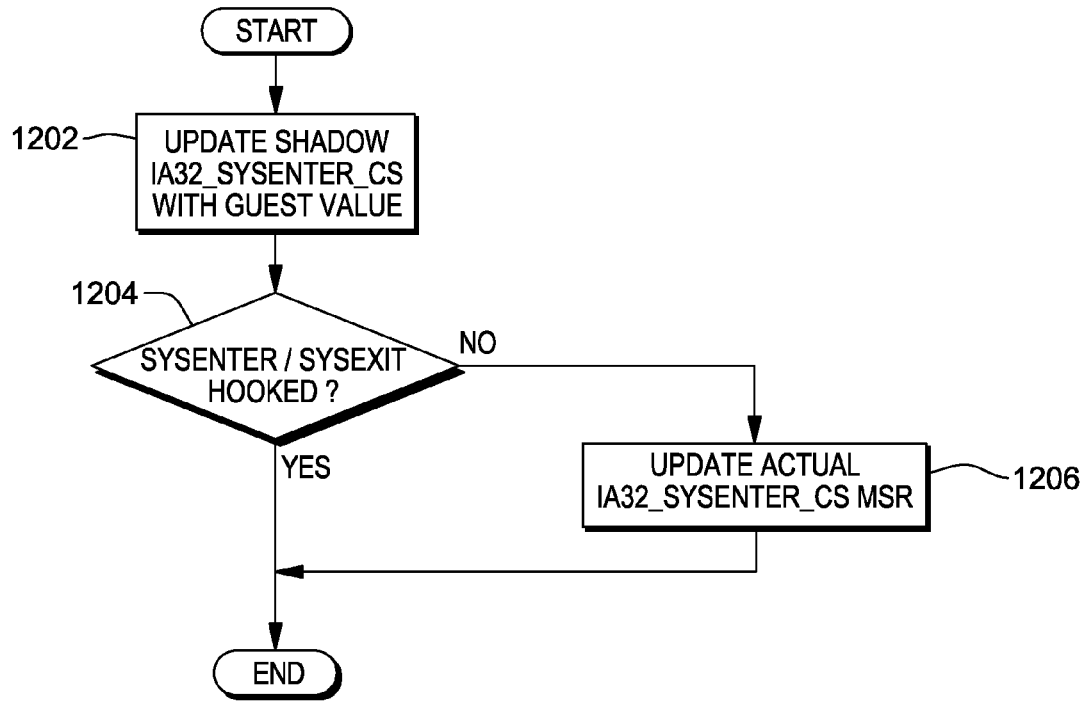
FIG. 12A depicts an example process for handling a virtual machine write attempt to the IA32_SYSENTER_CS model-specific register, in accordance with aspects described herein.
Figure 12B:
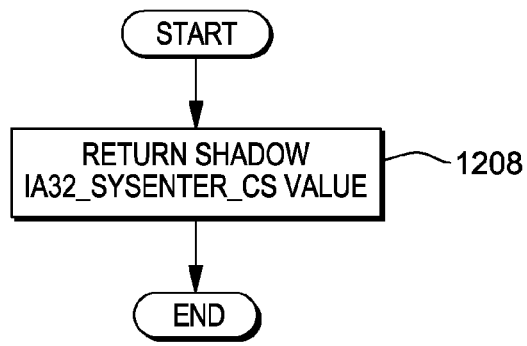
FIG. 12B depicts an example process for handling a virtual machine read attempt from the IA32_SYSENTER_CS model-specific register, in accordance with aspects described herein.

Accordingly, FIGS. 12A and 12B depict example processes for handling virtual machine write (FIG. 12A) and read (FIG. 12B) attempts, respectively, to the IA32_SYSENTER_CS model-specific register, in accordance with aspects described herein. Referring first to FIG. 12A, the process begins after a virtual machine write attempt to the IA32_SYSENTER_CS MSR is intercepted and the hypervisor invokes event handling (FIG. 6, #606) for the intercepted event. The shadow IA32_SYSENTER_CS is updated with the guest value (the value with which the guest attempts to update the IA32_SYSENTER_CS MSR) (1202). Next, it is determined whether the SYSENTER/SYSEXIT instruction is being hooked (i.e. enabled, see FIG. 3A) (1204). If so, then the update to the actual IA32_SYSENTER_CS MSR should not be allowed to complete, since it could potentially alter the values of IA32_SYSENTER_CS MSR and disable SYSENTER/SYSEXIT interception. Thus, the process ends, wherein only the shadow IA32_SYSENTER_CS was updated. If at (1204) it was determined that SYSENTER/SYSEXIT instruction interception is not enabled, then modification to the IA32_SYSENTER_CS MSR is acceptable, and the update is allowed to proceed (1206).

By the above, the shadow is always kept in sync, even when the MSR update is allowed to complete. This is for simplicity purposes, but in another approach, the shadow is updated only when it is determined that hooking is enabled. An additional check may be required, though, and similarly a check may be needed each time the MSR is read that determines whether hooking is enabled. By using the approach in FIG. 12A, the shadow can always be returned under any conditions (i.e. without checking for any conditionals), regardless of whether the actual MSR value is accurate or is modified to enable hooking.

FIG. 12B depicts an example process for handling a virtual machine read attempt from the IA32_SYSENTER_CS model-specific register. Again, the process begins after a virtual machine read attempt to the IA32_SYSENTER_CS MSR is intercepted and the hypervisor invokes event handling for the intercepted event. The process returns the shadow IA32_SYSENTER_CS value (1208) and ends. The process of FIG. 12B ensures that the target guest VM attempting to read from the IA32_SYSENTER_CS MSR believes that the instructions are valid, even if interception is occurring. As noted above, the simplicity of this process is facilitated because, in one example, the shadow IA32_SYSENTER_CS is being updated regardless of whether SYSENTER/SYSEXIT instruction hooking is enabled, i.e. even when the actual IA32_SYSENTER_CS MSR is accurate and not manipulated to force the hooking.

Figure 13A:
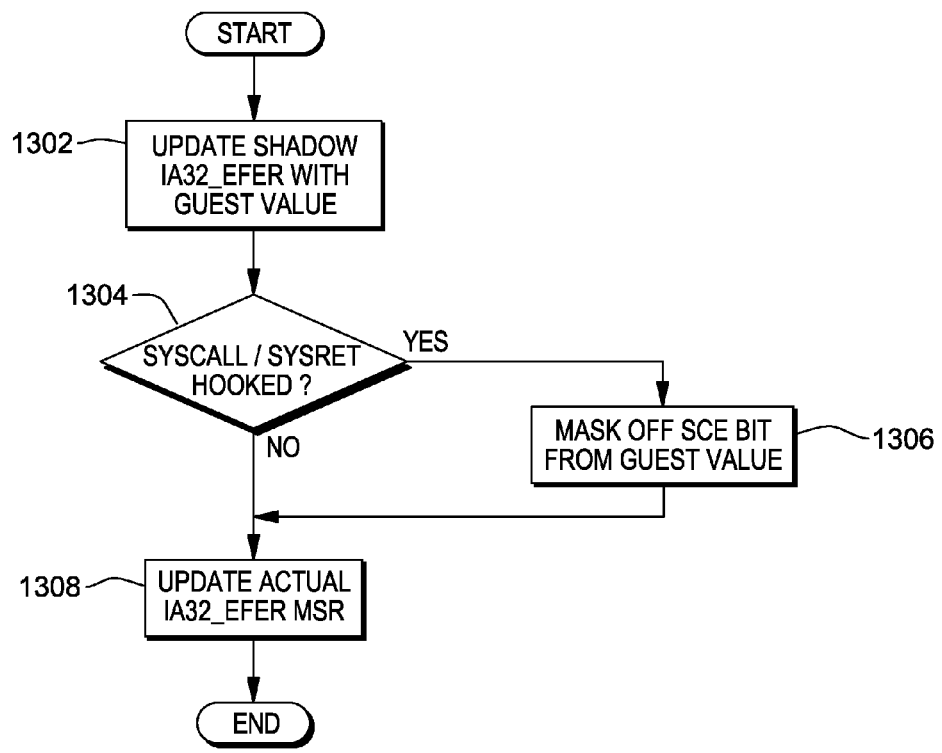
FIG. 13A depicts an example process for handling a virtual machine write attempt to the IA32_EFER model-specific register, in accordance with aspects described herein.

FIG. 13A depicts an example process for handling a virtual machine write attempt to the IA32_EFER model-specific register, in accordance with aspects described herein. The shadow IA32_EFER is updated with the guest value (the value with which the guest attempts to update the IA32_EFER MSR) (1302). Next, it is determined whether the SYSCALL/SYSRET instruction is being hooked (i.e. enabled, see FIG. 4A) (1304). If so, then an update to the IA32_EFER.SCE bit (since this is the bit that enables #UD exception interception) should not be allowed to complete, however an update to other bit(s) of the IA32_EFER MSR may be completed. Accordingly, the SCE bit of the guest value is masked-off or forced to 0 (1306). Then, or if at 1304 it was determined that SYSCALL/SYSRET is not being hooked, the actual IA32_EFER MSR is updated with the guest value (1308) (which may or may not have had its SCE bit masked off depending on whether SYSCALL/SYSRET instructions are being hooked).

Figure 13B:
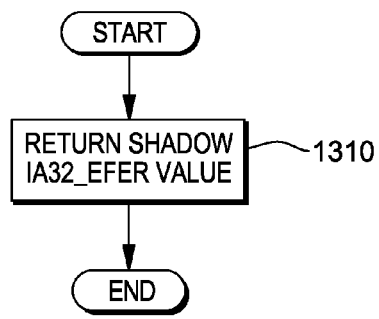
FIG. 13B depicts an example process for handling a virtual machine read attempt from the IA32_EFER model-specific register, in accordance with aspects described herein.

FIG. 13B depicts an example process for handling a virtual machine read attempt from the IA32_EFER model-specific register, in accordance with aspects described herein. The process returns the shadow IA32_EFER value (1310) and ends. The process of FIG. 13B ensures that the target guest VM attempting to read from the IA32_EFER MSR believes that the SYSCALL/SYSRET instructions are valid, even if interception is occurring.

As described briefly above, it may be desired to further handle only particular system calls, and to handle only particular corresponding system call returns. System call hooking provides, in some embodiments, information only from the caller's side, including the call number and arguments. In some embodiments, to facilitate analysis of results of a system call, aspects described herein provide a mechanism for intercepting the return from the system call.

Operating systems typically use a table that maps a call number to its respective function. For example, a call number of 0x74 might map to the NtOpenFile (or ZwOpenFile) function. When software performs a system call, the call number is moved into a register (% EAX general purpose register on Windows®/Linux®) making it identifiable and filterable, and the system call is executed, generally via SYSENTER, SYSCALL, or an interrupt. System call returns, however, may not be as simple to identify. When a system call completes, EAX may no longer hold the system call number. For example, on some operating systems such as Windows®-based operating systems, EAX is used to hold a result of the system call, where a 0 might indicate success. Some operating systems provide an OS-specific way of pairing a system call with its return. On a Windows®-based operating system, for instance, filtering on the thread ID at the call and return could be performed. However, it may nevertheless be desired to fashion a way of pairing a system call with its return in an OS-agnostic manner.

A system call interception bitmap can be maintained by the hypervisor for each target VM, and indicate the particular system calls that are of interest for introspection purposes to the privileged guest VM (i.e. a component thereof, such as one or more tools or one or more introspection libraries). The system call interception bitmap may be configured (directly or indirectly) by one or more components of the privileged guest VM, such as one or more libIntroVirt tools or an OS-specific introspection library, or interface library libIntroVirt, in order to specify which specific system call numbers should be passed to libIntroVirt, since perhaps not all system call numbers are of interest for introspection purposes. In one implementation, each bit on system bitmap page represents a single system call number. When a system call is intercepted by way of a fault, for instance, as described above, the process of FIG. 14 may be performed to check whether that particular system call (number, type, etc.) is of interest, i.e. whether it passes the system call bitmap check. In one example, the system call is deemed being of interest if the bit corresponding to the particular system call is set. Additionally, the bitmap may not be configured with respect to this particular system call, meaning that the hypervisor has not yet received an indication whether that particular system call is of interest. In this situation, the hypervisor can resort to a default, which may be to assume that the system call is of interest and pass the system call to the privileged guest VM, which would allow the proper component of the privileged guest VM to make a determination whether this system call number/type is of interest (now or for future calls) and cause the proper indication to be provided to the hypervisor so the hypervisor can set the corresponding bit accordingly.

If the system call is of interest, libIntroVirt may be notified by the hypervisor of the event and may be passed context information for the paused VCPU (register values, etc).

By way of example, a tool might be interested in system calls from file input/output (I/O) on one of more files, but have no interest in system calls that handle network traffic. In this case, system call(s) of the type related to file I/O might be indicated in the system call interception bitmap as being of interest, while system calls of the type related to network calling may either not be indicated in the bitmap at all or, alternatively, may be explicitly indicated in the bitmap as being not of interest.

When a system call is intercepted and the call number is not indicated by the bitmap as being of interest, the hypervisor may end event handling at that point and continue the target guest VM's VCPU. This approach may lower overhead dramatically for the system call hooking, since, in many instances, the majority of system calls would not be set to require additional handling—only those system calls that are of interest would be set to require additional handling. Thus, by configuring the system call bitmap appropriately, the hypervisor can resume the guest much quicker than if each and every system call was handed to libIntroVirt and processed further. The process of contacting libIntroVirt about a received system call may be relatively expensive compared to a simple check of the bitmap by the hypervisor, since the hypervisor can resume the guest and terminate handling at that point when the call is not of interest.

Figure 14:
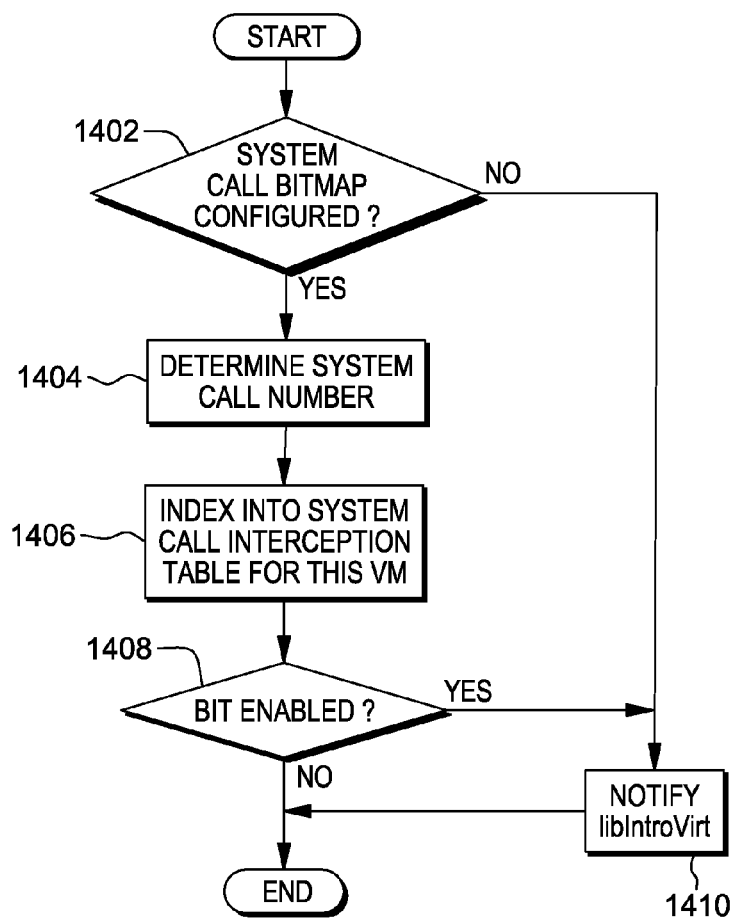
FIG. 14 depicts an example process for checking a system call bitmap, in accordance with aspects described herein.

In FIGS. 8, 9 and 11 described above, after a system call (such as SYSENTER, SYSCALL, or INT) is intercepted, a system call interception bitmap is checked (FIG. 8 #806, FIG. 9 #906, FIG. 11 #1106) to determine whether the call information should be passed to the privileged guest VM. FIG. 14 depicts an example process for checking a system call interception bitmap, in accordance with aspects described herein. This process is performed, in one example, by the hypervisor or a component thereof.

The process begins by checking whether the system call interception bitmap (also termed a system call interception table herein) is configured/enabled (1402). In one example, the bitmap is initially unconfigured/disabled, meaning that the hypervisor will intercept and provide indication of each system call without any filtering, until the bitmap is configured with respect to that particular type of system call. Once a bitmap is configured, or enabled, then only the system calls with a corresponding enabled bit are sent to libIntroVirt. Accordingly, if the system call bitmap is not configured, then libIntroVirt in the privileged guest VM is notified (1410), e.g. that the system call occurred. The library can decide to handle the system call in whatever way it chooses, for instance by ignoring it and resuming the VCPU if necessary, or by passing it to an underlying tool, for instance. Additionally, libIntroVirt or a tool can notify the hypervisor about whether or not it wants to hook this particular call number/type moving forward, and does so via a notification. Alternatively, libIntroVirt can map in the system call bitmap from the hypervisor, where, once mapped, libIntroVirt or a tool can change the bits therein directly through an API. Additionally, libIntroVirt can add a return hook to hook the corresponding system call return. In order to do so, libIntroVirt must have received an indication when the corresponding system call is made.

Otherwise, the system call bitmap is configured, in which case the process continues by determining the system call number of the system call (1404) and using this to index into the system call bitmap for the particular VM making the system call (1406).

In one implementation, the bitmap contains interception bits in a table, with each interception bit corresponding to a particular respective system call number. If the bit corresponding to a particular system call number is on (set to 1), the call will be passed to libIntroVirt; if it is off (set to 0), the call will not be passed and the guest will be resumed. Upon indexing into the table, is it determined whether an interception bit is set (enabled) (1408). If the bit is not set, then the process ends and the system call will not be passed along to libIntroVirt. Otherwise, libIntroVirt is notified that a system call was intercepted (1410). LibIntroVirt can then handle the system call appropriately, which might include determining whether to add a return hook for the particular system call.

Figure 15:
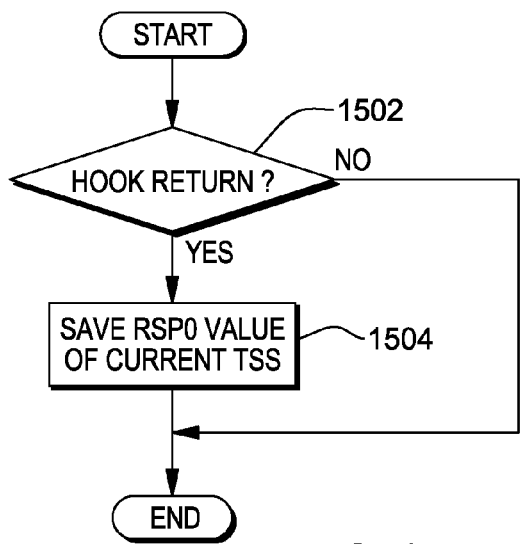
FIG. 15 depicts an example process for adding a fast system call return hook, in accordance with aspects described herein.

FIGS. 15 and 16 depict example processes for adding return hooks, in accordance with aspects described herein. FIG. 15 specifically depicts an example process for adding fast system call return hooks. That is, the process of FIG. 15 will determine whether a return corresponding to a current system call (SYSENTER, SYSCALL in the examples described herein) is to be intercepted, and if so, will register the hook to cause such interception. In one example, the process of FIG. 15 is performed by libIntroVirt, and may be performed in response to being notified (by the hypervisor) that a system call was intercepted (FIG. 14, #1410) and based on a tool of the privileged guest machine indicating that it is interested in hooking the return.

In the case of a fast system call, the value of RSP0 in the Task State Segment (TSS) is noted. The TSS is a structure that holds information about a task. Each thread on a system has a unique set of TSS values. RSP0 is the stack that is used when a thread transitions into the kernel. This value may be used to uniquely identify a thread, and thus match a system call with its return. The RSP0 field contains the stack pointer for the kernel of the guest VM OS and is unique for each active thread on the system; it identifies a specific thread on a specific virtual machine (or a real machine). It is possible that two (or more) VMs each have a thread with a same RSP0 value, however this is accounted for in that the mapping is held on a per-VM basis. The value of RSP0 is passed along to libIntroVirt, which decides, based on this value, if the system call return is to be hooked or not. If the call is to be hooked, libIntroVirt informs the hypervisor of the RSP0 value to look for, and the hypervisor stores it.

In this example, the value of RSP0 is used to uniquely identify a thread for purposes of return hooking, though other approaches are possible, so long as a call return can be correctly correlated to a particular thread making the initial call.

The process of FIG. 15 thus begins by determining whether to hook the corresponding return (1502). A libIntroVirt-based tool may decide whether the return should be hooked. In one example, a tool interested in a system call might intercept the call, see that it will be doing something of interest, and then decide to hook it (i.e. further calls of that type and/or its corresponding return). If the corresponding return is to be hooked, then the RSP0 value of the current task selector segment is saved with the hypervisor. In this regard, the tool may provide the RSP0 value to the hypervisor (via libIntroVirt) and the hypervisor may maintain a set of RSP0 values indicating the threads for which notifications of system call returns should be provided to the privileged guest VM. Then, or if it was determined not to hook the return, the process ends.

FIG. 16 depicts an example process for adding an IRET instruction return hook, in accordance with aspects described herein. Hooking in this context is provided by changing the SS.DPL from 3 (user mode software allowed) to 0 (only kernel level privileges). Thus, it is determined whether to hook the corresponding IRET return (1602), and if so, the SS.DPL on the return stack is changed from 3 to 0 (1604). Then, or if it was determined not to hook the return, the process ends.

Upon intercepting an IRET return, as described above with respect to FIG. 9, it will be determined (902) that the IRET was intercepted, then the return stack will be repaired by changing the SS.DPL back to 3 from 0 (FIG. 9, #908), and libIntroVirt will then be notified of the return (FIG. 9, #910).

Figure 17:
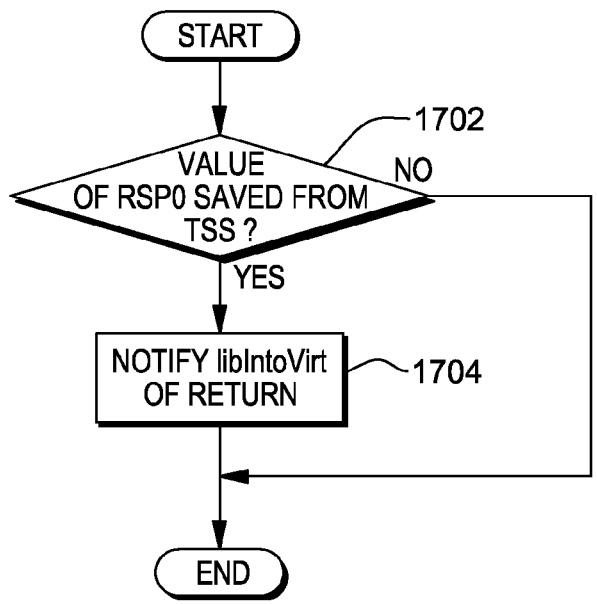
FIG. 17 depicts an example process for handling a fast system call return interception event, in accordance with aspects described herein.

Upon intercepting a fast system call return (i.e. SYSEXIT or SYSRET), system call return interception processing will be invoked (FIG. 8, #808; FIG. 11 #1108) and performed by the hypervisor to handle the fast system call return interception event. FIG. 17 depicts an example process for handling a fast system call return interception event, in accordance with aspects described herein. The process begins by checking in the RSP0 capture list maintained by the hypervisor (in one example) whether the RSP0 value from the current task selector segment is saved (1702). If it was saved, then that indicates the current return was hooked by libIntroVirt or an underlying introspection library or tool. The RSP0 value may be cleared from the capture list, and libIntroVirt may then be notified of the return (1704) so that libIntroVirt, an introspection library, and/or tool may handle the event further, if desired. Then, or if the RSP0 value from the current task selector segment was not saved, the process ends.

Example libWintroVirt Implementation:

With knowledge of system call numbers for different versions of Windows®-based operating systems and the ability of libWintroVirt to parse kernel structures, tools (e.g., 118 of FIG. 1) can pull out specific information from the intercepted system calls without the need for a low-level understanding of Windows®-based internals. In some embodiments, the tool implements a libWintroVirt callback class to receive event information. A libIntroVirt tool can extend a libIntroVirt-based callback class. For instance, a tool can register a handler for system calls, and will be handed, via the hypervisor, libIntroVirt, and libWintroVirt, for instance, a Windows KPCR (Kernel Processor Control Region) object, which contains information about the process making the call, such as process ID, thread ID, and the name of the process. The tool 118 can then use a libWintroVirt-provided parser for the system call in question. The KPCR may be a Windows®-specific structure, and part of libWintroVirt. It may be instantiated by libWintroVirt and handed to a tool via event callback method(s). When a tool receives an event for a system call return, it may create an instance of the correct handler and save it. Upon receiving the return (from the system call return callback), the instance is looked up, and a method is called to give it the result context.

By way of specific example, the ZwCreateFile class (part of Windows® kernel-mode driver architecture) is able to retrieve the name of the file being opened from the corresponding Windows® system call without the user knowing the implementation details of doing so. Likewise, as described above, system call returns are provided via a callback method registered in the same manner. ZwCreateFile class is an example of a libWintroVirt callback class, which provides methods for both system calls and system call returns.

Arbitrary System Breakpoints:

Arbitrary system breakpoints can be achieved by overwriting a targeted address with a special instruction, such as INT 3 (the normal software breakpoint command), which would notify the hypervisor and pause the VCPU of the target virtual machine. The toolstack (either the hypervisor or libIntroVirt) may map the guest virtual machine's memory and overwrite an original instruction at an address with a special breakpoint instruction. To resume the VCPU, in one example, the hypervisor overwrites the special breakpoint instruction with the original instruction, adjusts the instruction pointer back to the address (which now holds the original instruction), and enables a Trap flag of the FLAGS register. The Trap flag causes the target guest virtual machine to run a single instruction—the original instruction, at the address—after which a trap is made back to the hypervisor, which re-inserts the special debug instruction at the address and lets the target guest virtual machine resume execution as normal.

Note that the above Trap enablement is just one example of breakpoint functionality; there are other methods, including those in which the breakpoint is not reset.

Figure 18:
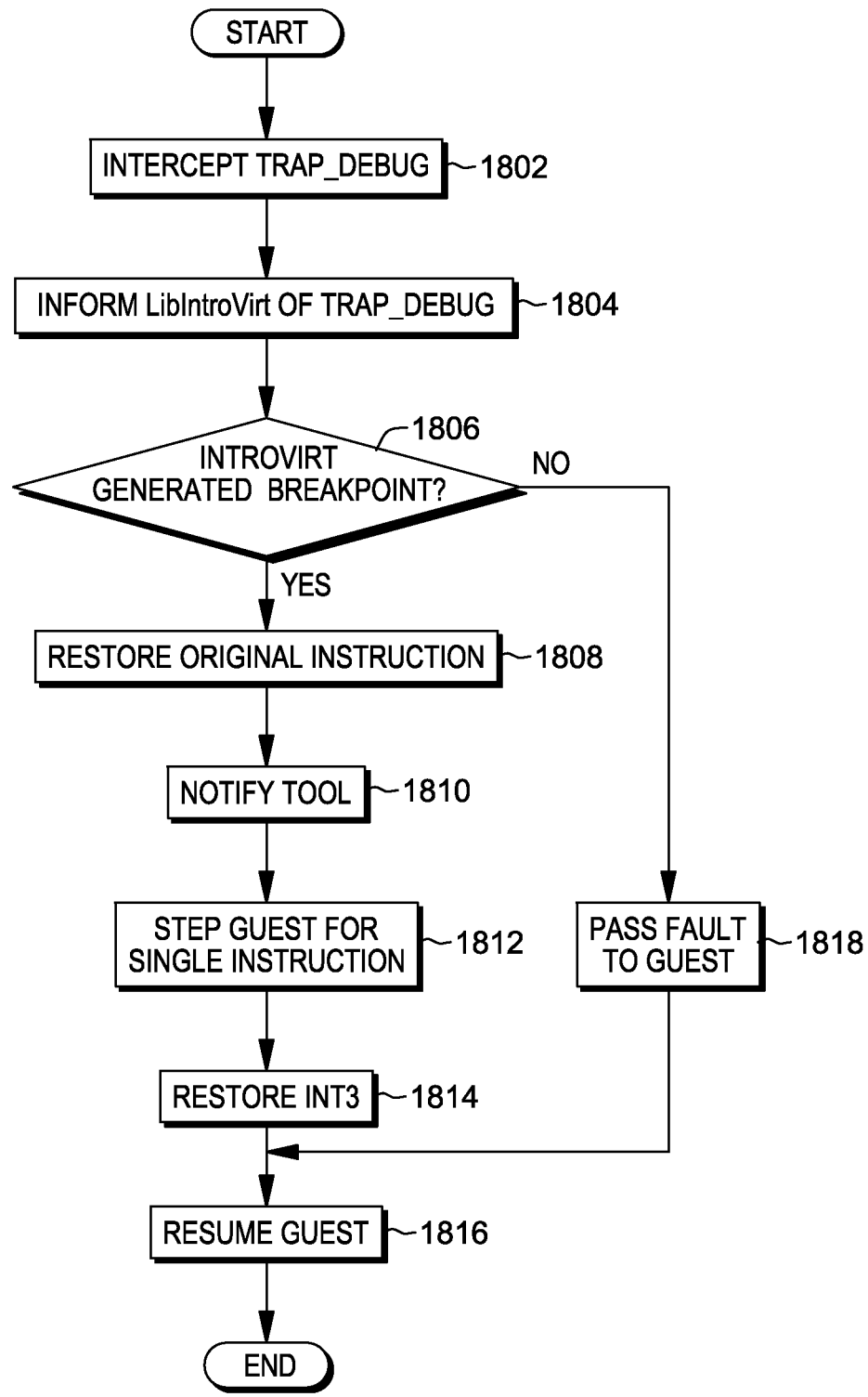
FIG. 18 depicts an example process for breakpointing, in accordance with aspects described herein.

FIG. 18 depicts an example such process for breakpointing using the INT3 instruction. As noted above, a target instruction is overwritten with an INT3 (0xCC) instruction, causing it to generate a TRAP_debug when executed. The process of FIG. 18 may be performed by the hypervisor based on the application executing on the target VM triggering execution of the INT3 instruction. The process begins with the hypervisor intercepting a TRAP_debug (1802). The hypervisor then informs libIntroVirt of the TRAP_debug (1804). A determination is made as to whether this breakpoint was an IntroVirt-generated breakpoint (i.e. one that was inserted by the hypervisor for the purposes of introspection) (1806). In this regard, certain breakpoints may be placed by IntroVirt, while others may be placed by guest programs as part of their normal operation (such as debuggers). An indication may be maintained by IntroVirt as to which breakpoints it inserted. If the encountered breakpoint is an IntroVirt-generated breakpoint, the original instruction (overwritten by the INT3 breakpoint) is restored (1808) to the address, the appropriate tool in the privileged guest is notified (1810), and the guest is stepped for a single instruction (1812) (for instance by setting the TRAP flag and resuming the target VM, which will trap to the hypervisor after executing the original instruction). Next, the INT3 instruction is restored (1814) to the address, again overwriting the target instruction at the address, and the guest is resumed (1816).

If at (1806) it was determined that the breakpoint was not generated by IntroVirt, then the fault is passed to the guest (1818), which is resumed (1816) for normal fault processing.

In some examples, this method may provide enhanced performance (e.g. speed) over other approaches, such as a page table approach. In an example of a page table approach, shadow page tables of the hypervisor are used to control access to sections of memory, i.e. write protecting several pages of memory to catch when a guest attempts to modify them. Intel® and AMD® have additional technologies that facilitate this. The page table approach might be slower than the approach above, as the mechanism is less granular. In contrast, in the approach above, only the specific addresses being targeted will notify the hypervisor. The method results in modification to the target guest virtual machine, however, in which case self-scanning code may notice that change and potentially circumvent it (albeit the likelihood of noticing may be small).

HAP Breakpoint Handler:

As noted, breakpointing on an entire page of memory may be enabled. Memory breakpointing can be implemented by changing the access permissions on individual pages of memory. These permission changes occur on Intel®'s Extended Page Tables, which are a mapping of guest physical memory to hardware physical memory. Once a page is accessed by a guest VM in a way that triggers a breakpoint, IntroVirt can pause all other VCPUs, enable single-stepping of the target guest VM, and clear the memory breakpoint. When the step completes, the breakpoint can be restored and all VCPUs can be unpaused. Unlike INT3 breakpointing, the modifications that occur, i.e. those to the page table permissions, occur outside of the guest, which prevents it from detecting or altering the breakpoints. In addition to being invisible to the guest, memory breakpointing allows IntroVirt to breakpoint on reads and writes, rather than just executes, as is the case with INT3 breakpointing.

This type of memory breakpointing is referred to herein as Hardware Assisted Paging (HAP) breakpointing and allows for any combination of read/write/execute breakpointing on an entire page of memory. While it has the advantage of being undetectable to a guest and unmodifiable by the guest, since no modification is being done to the guest's memory, as noted above it may result in poorer performance due to the lower granularity; even if only a single instruction is of interest, every instruction on the entire page of memory is intercepted and must be filtered out.

Figure 19:
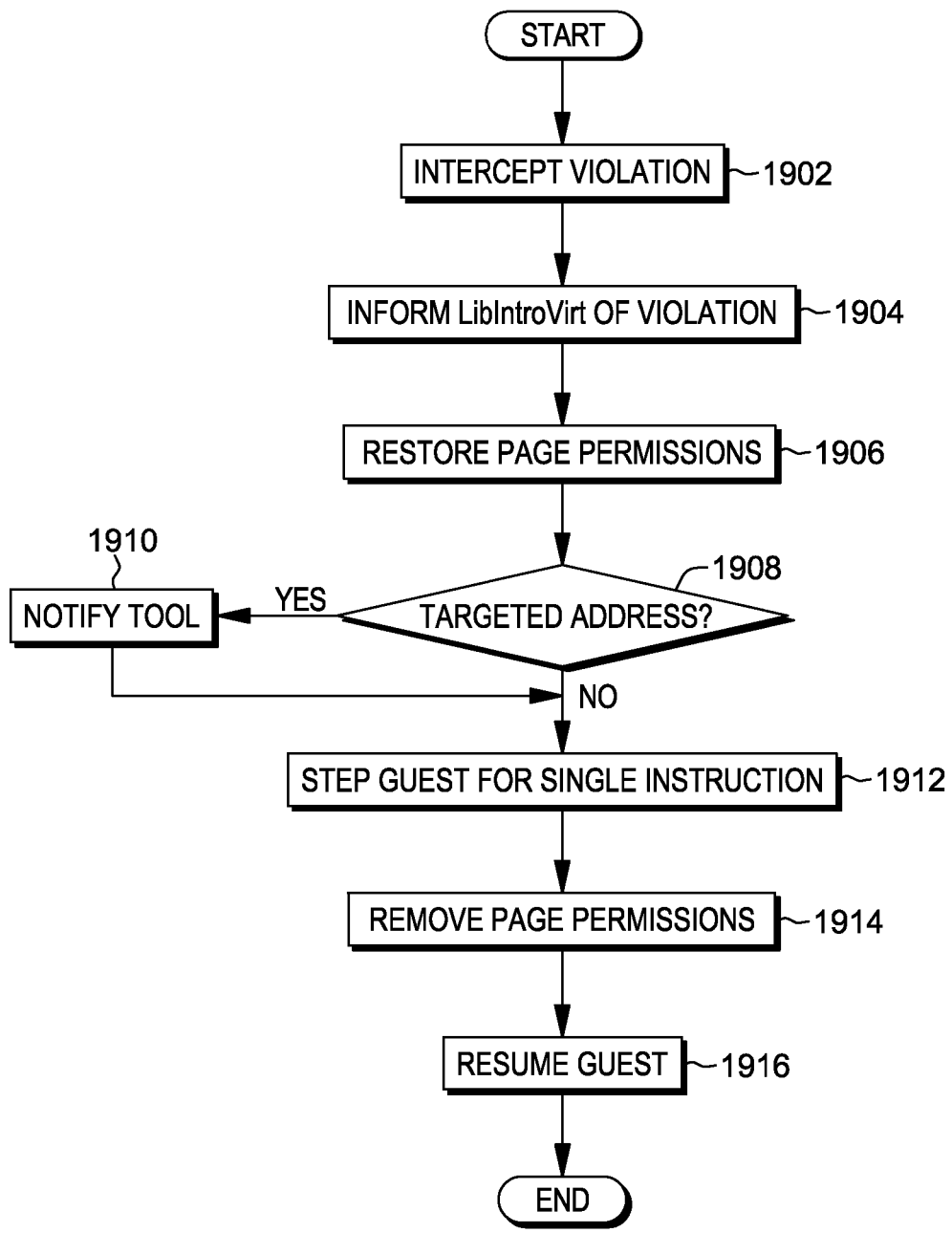
FIG. 19 depicts an example process for Hardware Assisted Paging (HAP) breakpointing, in accordance with aspects described herein.

FIG. 19 depicts an example process for Hardware Assisted Paging (HAP) breakpointing, in accordance with aspects described herein. The process of FIG. 19 is initiated based on an application (of a target VM) triggering a HAP violation, e.g. attempting to read/write/execute on a page having the permissions set not to allow such access by the VM. The process begins with the hypervisor intercepting the violation (1902), which may come in the form of a HAP violation, as an example. The hypervisor then informs libIntroVirt of the violation (1904). The page's permissions are then restored (1906) allowing the guest the permission is needs for the page table access, and it is determined whether the current page address is a targeted address (1908), that is, one that is of interest for introspection purposes. If so, the appropriate tool is notified (1910). Then, or if the current page address is not a targeted address, the guest is stepped for a single instruction (1912) in which the guest accesses the page, then page permissions are revoked (1914), and the guest is resumed (1916).

Hybrid Breakpointing:

Compared to INT3 breakpointing, memory breakpointing may be slower. Setting a memory breakpoint for a single instruction causes every instruction on the entire page to be intercepted. A more robust breakpointing scheme can be accomplished by leveraging the speed of INT3 breakpointing, and the stealth of memory breakpointing. To accomplish this, INT3 breakpointing is installed, as described above, but with read/write restrictions on the memory page containing the target address (i.e. reads and writes are intercepted with HAP breakpointing in order to prevent the guest from seeing or modifying the inserted INT3 instruction). More specifically, when the INT3 at the target address is hit, a breakpoint is received and IntroVirt handles it as usual (see FIG. 18). The read/write restrictions allow IntroVirt to hide the INT3 and this breakpointing from the guest by restoring the original instruction for one instruction, i.e. when the page is accessed by the VM. Likewise, when the guest writes to the page, IntroVirt will ensure that any updated instruction written to that address by the guest is saved, and that the INT3 remains or is re-written to the target address. In this manner, if the guest attempts to overwrite its own memory (including, for instance, the inserted INT3), then IntroVirt will save the updated instruction written to the address, and re-write the INT3 at the address to preserve the breakpoint. Thus, only executing the target instruction triggers the INT3 breakpoint, and the INT3 breakpoint is safe from modification or detection.

Figure 20:
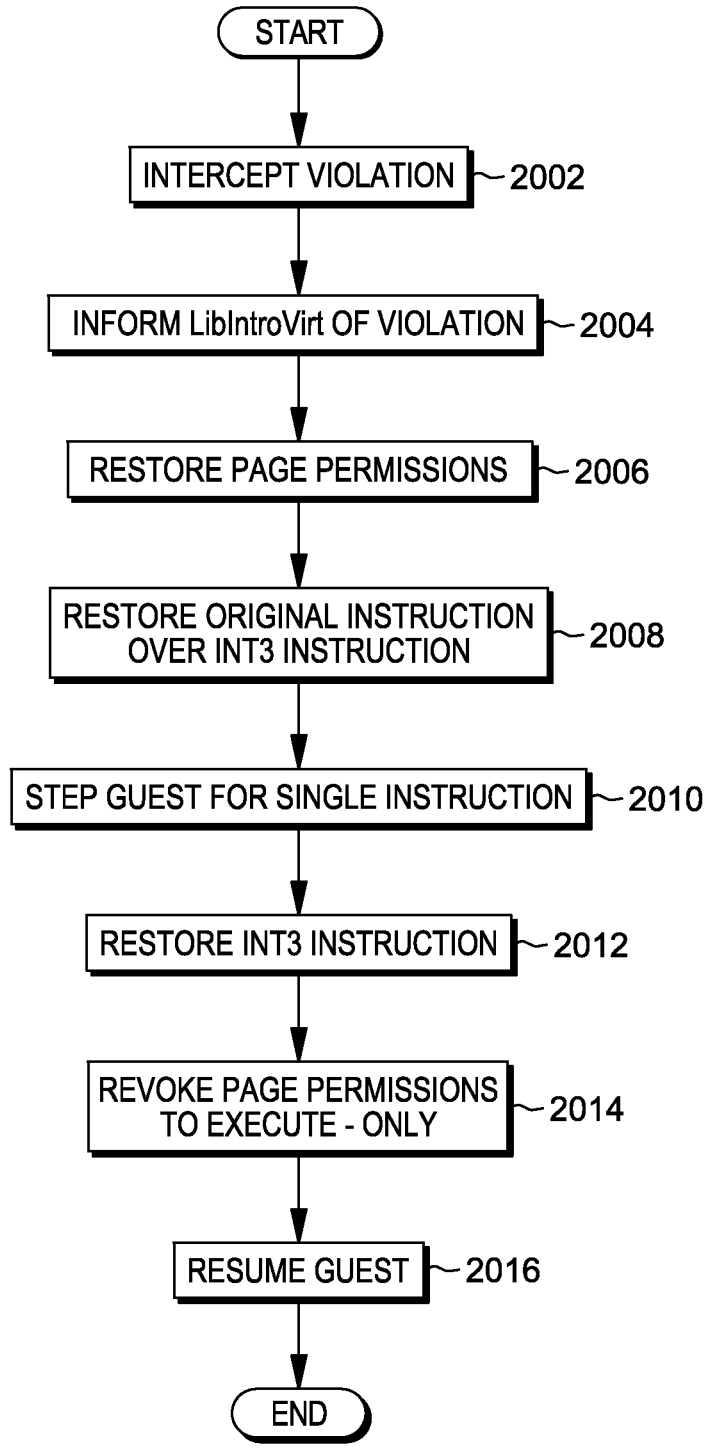
FIG. 20 depicts an example process for hybrid breakpointing, in accordance with aspects described herein.

FIG. 20 depicts an example process for hybrid breakpointing, in accordance with aspects described herein. The process is triggered based on the application triggering a HAP read/write violation, i.e. an attempted read/write access on the page. As before with HAP processing, the process begins by the hypervisor intercepting the violation (2002), informing libIntroVirt of the violation (2004), and restoring the page permissions (2006) to allow the access to occur. The original instruction is then restored over the INT3 that was inserted (2008), the guest is stepped for a single instruction (2010), and the INT3 instruction is then restored to the page (2012) to again overwrite the instruction. The page's permissions are revoked to execute-only (2014), and the guest is resumed (2016). In this manner, the guest never sees the inserted INT3 instruction during a read attempt of the page, the original instruction is available for the guest to execute, and the INT3 is preserved even when the guest writes to the page.

Example Privileged Guest Virtual Machine Tools:

The following example tools were developed to demonstrate and exercise capabilities of the above-described framework, and usually focus on software analysis and reverse engineering applications targeting Microsoft® Windows®-based operating systems. These are just examples to highlight facilities enabled by aspects described herein. Applicability of the tools to other operating systems, architectures, and frameworks, and applicability of the aspects described herein to develop other tools of the privileged guest virtual machine are also recognized.

Ivcr3mon:

This tool registers a callback with the hypervisor to be notified of changes to the CR3 control register (see FIG. 2, #204). The CR3 register facilitates address translation by holding the physical address of the page directory and optionally page tables for a given process, and each process on the system has its own CR3 value. Each time a context switch to a new process occurs, the Ivcr3mon tool prints the name and PID of the process.

Ivdetective:

Ivdetective watches for suspicious API calls, such as remote creation of a thread in another process, and may optionally terminate any process that attempts to use them. Suspicious API calls may be selected as any one or more of the system calls and/or returns that the IntroVirt framework can be configured to intercept. A process making suspicious API calls may be terminated, in this example, by catching a system call and then modifying the system call number to one that terminates the process. The arguments to the call may also be modified appropriately to cause the new call to fail. Additionally or alternatively, the call could be made to fail but a forged 'success' make be reported to the software. This tool is capable of catching the well-known Meterpreter software, promulgated by the Metasploit® project when it attempts to migrate to another process (Metasploit is a registered trademark of RAPID7 LLC, Boston, Mass., USA).

Ivdllmon:

Ivdllmon can walk through all of the exports for user-specified DLLs, and install breakpoints at each function it can find. This allows tracing of userland (ring 3) DLL files. The tool can watch library calls to interesting DLL files using breakpoints by looking for a process of interest, as indicated by a user, and reading memory structures to determine where functions are in memory.

Ivfileprotect:

Ivfileprotect takes a file name as an argument and will deny processes from opening the file by watching for ZwCreateFile and ZwOpenFile system calls, which may be called via the SYSENTER/SYSCALL/INT mechanisms. For example, the call to open may be denied by changing the call number to an invalid call number, and allowing the call (with the invalid call number) to complete. Next, the return can be hooked, and the resulting error can be modified to STATUS_ACCESS_DENIED.

Ivguestinfo:

Ivguestinfo may watch for a CR3 change and then parse Windows®-based OS memory via libWintroVirt to display information. Ivguestinfo may display information about the target guest virtual machine, including operating system version and service pack number. It may also produce a table of system call names paired with their corresponding numbers.

Ivinstrtrace:

Ivinstrtrace single-steps a user-specified process, printing each instruction before allowing it to be executed. For instance, the hypervisor may be notified to cause an IntroVirt event to be sent to libIntroVirt after every instruction is executed by the guest. The tool can look at the instruction pointer register to determine where the current instruction is in memory and then read the instruction from memory and disassemble it. It is also possible for the tool to look ahead to subsequent instructions at other addresses in memory. The tool uses, in one example, the Udis86 library for instruction decoding.

Ivioctlmon:

Ivioctlmon monitors userland-to-driver interaction (ioctls), optionally producing a Pcap (packet capture) file that can be analyzed with packet analyzers, such as Wireshark® (Wireshark is a registered trademark of Wireshark Foundation Inc. Corporation, California, USA). More particularly, specific system calls, such as calls to ZwDeviceIoControlFile, may be registered with libIntroVirt for further introspection by the Ivioctlmon tool.

Ivkeyspoof:

Ivkeyspoof watches for registry reads to the high score keys of the Minesweeper game (commonly included in Windows®-based operating systems). When a process requests the scores, false data is returned. This tool watches for registry-based system calls. After a corresponding return is intercepted, the tool can change the result data before resuming the guest VCPU.

Ivkspace:

Ivkspace may parse kernel structures to produce a list of loaded kernel modules, as well as a list of running processes. Thus, this tool may be similar to Ivguestinfo tool above except for the information printed.

Ivnetmon:

Ivnetmon watches for ioctls in a similar fashion to Ivioctlmon, but with a focus on network traffic. By intercepting the appropriate system calls, raw network traffic can be displayed and/or modified.

Iv404:

Iv404 watches for reads and writes to the Ancillary Function Driver (AFD) and is able to identify HTTP traffic. Specifically, it is able to parse an HTTP response header and body and modify either or both. For example, the HTTP response header status can be modified from 200 (Ok) to 404 (Resource Not Found) in addition to modifying the body (HTML) content. In tests, the Iv404 tool was able to 'man-in-the-middle' normal web page browsing and block/mangle certain HTML page content.

Ivoverlayfs:

Ivoverlayfs watches for system calls related to listing files and folders in a directory. It then inserts false information, making a non-existent folder (with files) appear to targeted applications in the target guest virtual machine. Additionally or alternatively, it can simulate the existence of one of more files, and if the target guest virtual machine attempts to read/write from/to the file, a memory buffer can be written to or read from to simulate the file's existence.

Ivprocinfo:

Ivprocinfo can list all/some running processes, or can be given a specific PID or process name. It can optionally dump information about each process, including the virtual address descriptors (VAD), the process environment block (PEB), the security identifier (SID), a list of open handles, and all environmental variables with their corresponding values.

Ivrngspoof:

Ivrngspoof can use the breakpoint API to manipulate memory when the breakpoint is hit. By way of specific example, a breakpoint can be installed in the rand( ) function of the Microsoft® Visual C runtime library "msvcrt.dll", forcing it to return arbitrary data controlled or dictated by the tool and/or hypervisor.

Ivsyscallmon:

Ivsyscallmon may provide information about some/all system calls and returns, for instance in a human readable format. It may leverage all of the available system call parsers from a particular introspection library (such as libWintroVirt), and display detailed information about each system call, as it occurs. The tool can also display system calls that are not handled by libWintroVirt, displaying, for instance, the name of the call.

Ivwinmine:

Ivwinmine hooks the Minesweeper application (commonly included in Windows®-based operating systems) at the point immediately after the board is generated, utilizing, for instance, a breakpoint. It may then wipe the board, replacing it with one that displays a predefined text string or other data.

Mentat:

One or more tools may be provided in conjunction with a user interface, for instance as part of another tool. Mentat is a tool based off of the "QT" application framework, and implements several of the above tools through a GUI. It can display indications of system calls, protect files, detect and block suspicious API calls, and track open handles, as examples. In addition, it may also provide process fingerprinting, in which a process is uniquely 'fingerprinted' based on the system calls, generating a graphical representation of the system calls that were executed. Mentat can also prevent drivers from being loaded, to, for instance, prevent malware from loading kernel mode rootkits.

Application Domains:

Aspects described herein have application in many domains. Aspects of the above are designed so that future userland introspection tools can be rapidly developed and leverage functionality provided by the interface library (libIntroVirt) and introspection libraries (libWintroVirt, libIntroVirt). Indentified below are just a sampling of such application domains:

Reverse Engineering:

Aspects described herein can be used to gain an understanding of software's behavior by monitoring system calls as the software runs within a target guest VM environment. Optionally, every file and registry key accessed by a device, as well as each read and write to the file or key, can be logged and analyzed by a reverse engineer. For example, facilities provided herein can be used to locate where the Minesweeper game saves its high scores, simply by logging registry-related system calls when the game is played. The engineer would be able to see a write to a registry key used by the game, without having to debug the program by hand or perform static analysis on the binary. More broadly, these facilities enable observation of any registry keys or files accessed by a program, to enable identification of application data created, accessed, and/or modified during program execution.

Malware Analysis:

Along similar lines as reverse engineering, facilities described herein could be used to analyze malware and determine which files and registry keys it accesses. It is possible to write a tool (e.g. 118 of FIG. 1) that uses the appropriate privileged guest virtual machine libraries (e.g. libWintroVirt, libXtroVirt, depending on the underlying OS of the target guest VM) to detect suspicious behavior in the execution by the target guest virtual machine, pause the target guest virtual machine, and dump the suspicious executable from memory, all absent user interaction.

Forensics:

Since it is fairly simple to access all of the memory associated with a target guest virtual machine from a privileged guest virtual machine (e.g. Dom0) utility, aspects described herein can be used to trigger a memory capture automatically for any number of reasons, allowing analysis in any standard memory-image-analysis software. It would also be possible to perform auditing, keeping an external log of when important files were accessed on the guest. If the guest were to be compromised, a secure audit log would be externally available.

Guest Protection:

Protection of target guest virtual machines is also possible. For example, by monitoring calls to ZwCreateFile, a tool, utilizing functionality (e.g. parsers) of libWintroVirt for instance, could reject attempts to open system files for writing. In one example, this may be accomplished by modifying the parameters being passed to ZwCreateFile, causing the call to fail. Files could also be scanned, as they are opened, using a virus scanner external to the target guest VM attempting to use the file, and suspicious applications could be selectively sandboxed or terminated.

Training and Simulation:

The framework described herein provides an excellent platform for cyber operations training and simulation. By providing a monitoring capability of target guest virtual machines, it is possible to examine the behavior of users while participating in cyber exercises.

Additional Applications:

Dynamic Forensics Platform:

Using aspects described herein as a framework for a forensics platform allows for a broad base of functionality. A forensic hard disk image can be booted into a target guest virtual environment while a tool (e.g. 118 of FIG. 1) logs forensically-relevant system interactions.

Standard Debugger

Aspects described herein can be leveraged as a multi-purpose debugger including: userland debugging, kernel mode debugging, API hook interception, thin debugging, and instruction tracing in both static and live applications.

Training Environment:

Incorporating aspects described herein into a training and/or simulation environment allows a trainer to alter the state of the training while in process to increase or decrease the challenge of the task or introduce new variables. Training examples may include red/blue team events, forensics, or exploit development, as examples.

Fuzz Testing Suite—Zero-Day Generator:

A fuzz testing tool can be developed for generating Zero-day vulnerabilities. This tool can be used to test new software developed internally, as a service to test external software, or to test software before purchasing and installing on the internal network.

Protected Workstation:

A system can be hardened using a suite of protections powered by the architecture described above. The protected workstation can protect from path modification, provide access controls and data loss prevention, prevent questionable API calls, and enforce SELinux policies, as examples.

Access Control:

Because aspects described herein can monitor all API calls that occur on a target guest virtual machine, a tool can be used to reference these calls against a detected level of privilege of a user. If an API call attempts to access something above the user's privilege, the call can be blocked as described above. It may also be appropriate for the tool to alert the user that he/she does not have the appropriate privilege level to perform that particular action.

Data Obfuscation:

Data in memory can be changed. Because of this, a tool can be created that can recognize a user's level of privilege and display data accordingly. A user-employee from a finance group of an organization, for instance, can be allowed to open an employee datasheet, but only view his/her name, salary, and timesheet, whereas a user from a human resources group of that company may be able to see the employee's name, address, and phone number, but not salary information. A third group of that company may see the employee ID's rather than his/her name.

Block and Blacklist Processes:

The ability of the privileged guest virtual machine to see and control all API calls can be utilized to block and/or blacklist certain applications. If a user attempts to open an unapproved application, such as a Tor client, p2p application, or any untrusted software, aspects described herein can recognize the API calls and block them. The proposed tool could view API calls and auto-blacklist software based on these calls. For instance, a p2p software program could be blacklisted from continued execution or subsequent launching based on the tool recognizing that the program makes a call to open a specific port.

Hardware Troubleshooting:

The libIntroVirt interface library may be capable of parsing the list of loaded kernel modules in Windows® guest VMs. Thus, a tool using the libIntroVirt interface library could determine what drivers of a target guest VM are in place, what ones are missing, what ones are non-working, etc.

Antivirus Through Software Fingerprinting:

As described above, a tool can "fingerprint" software by its API calls to determine a baseline signature. Software that has been compromised by malware being embedded into it, when run, will have a different signature than its uncompromised version. Therefore, the compromised software may become untrusted and blocked using facilities described herein. Using the same technique, software companies can determine whether a licensed software product (an Operating System, productivity suite, etc) is genuine.

Data Loss Prevention:

By monitoring API calls, a tool can be used to determine if sensitive information is being deleted, altered, or transferred through removable media, p2p software, file transfer protocol (FTP) transmission, or email, as examples. Once detected, the tool can stop the execution of the transfer of data or alteration thereto.

Counter-Anti-Debugging:

Anti-debugging code in malware is becoming more common. A tool can leverage the libIntroVirt interface library to falsify requests from malware. For instance, it is common for malware to "phone home" to ensure it has internet access as well as access to its controller. Malware may attempt to work with files to further bury itself, install backdoors or Remote Access Trojans (RATs), exfiltrate or corrupt data, or to spread. The tool may falsify responses, such as by providing a dummy contacts list file or fake registry, as examples.

Efficiency Testing:

Because software efficiency can sometimes be measured in the number of API calls, a tool can be created that compares the number of calls a piece of software makes against the number of calls made by similar software.

Described herein are facilities for analysis of software behavior through virtual machine (VM) introspection. These facilities can reduce the "ramp-up" time for new developers to write introspection software, providing the foundation for hooking in general as well as an API for analyzing virtual machines running various operating systems. Aspects described herein enable developers to quickly and easily implement new introspection tools that may be very specifically targeted to particular files, behaviors, activity, etc.

Those having ordinary skill in the art will recognize that aspects of the present invention may be embodied in one or more systems, one or more methods and/or one or more computer program products. In some embodiments, aspects of the present invention may be embodied entirely in hardware, entirely in software (for instance in firmware, resident software, micro-code, etc.), or in a combination of software and hardware aspects that may all generally be referred to herein as a "system" and include circuit(s) and/or module(s).

Figure 21:
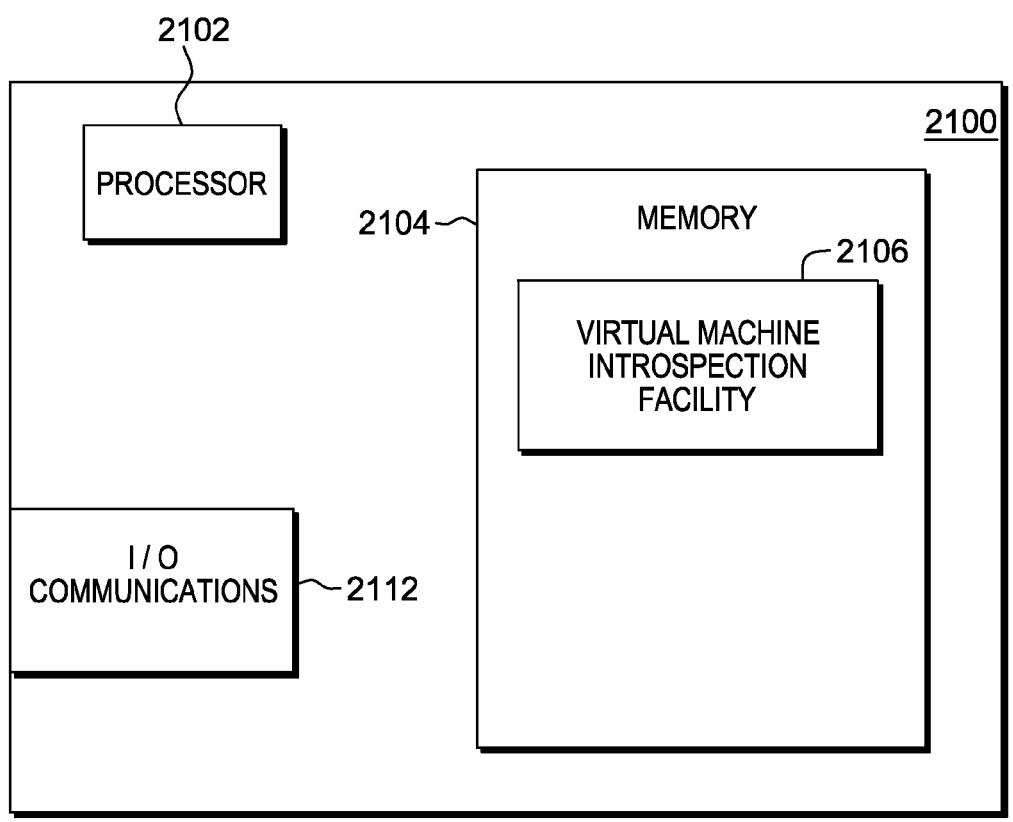
FIG. 21 depicts one example embodiment of a system incorporating aspects described herein.

FIG. 21 depicts one example embodiment of a system incorporating aspects described herein, specifically a virtual machine introspection facility. In one example, the virtual machine introspection facility includes software for execution to perform aspects described herein. This software includes, in some embodiments, a hypervisor configured in accordance with aspects described herein, as well as a privileged guest machine that executes to perform functions described herein. Data processing system 2100 includes a processor 2102 and memory 2104. Processor 2102 comprises any appropriate hardware component(s) capable of executing one or more instructions from memory 2104. Memory 2104 includes virtual machine introspection facility 2106 that executes to perform/provide facilities described herein, such as hypervisor code and code for executing a privileged guest machine. Additionally, memory 2104 can include other guest machines and/or virtual environments and facilities thereof (not pictured) for execution, wherein introspection of these other guest machines is provided.

Further, data processing system 2100 includes an input/output (I/O) communications interface component 2112 for communicating data between data processing system 2100 and external devices, such as I/O and peripheral devices (mouse, keyboard, display devices) and network devices. In another embodiment, data processing system 2100 comprises a universal serial bus (USB) or peripheral component interconnect (PCI) device, in which case I/O communications interface component 2112 comprises, respectively, a USB or PCI adapter configured to couple to a USB or PCI port of the computing platform.

In some embodiments, aspects of the present invention may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 22:
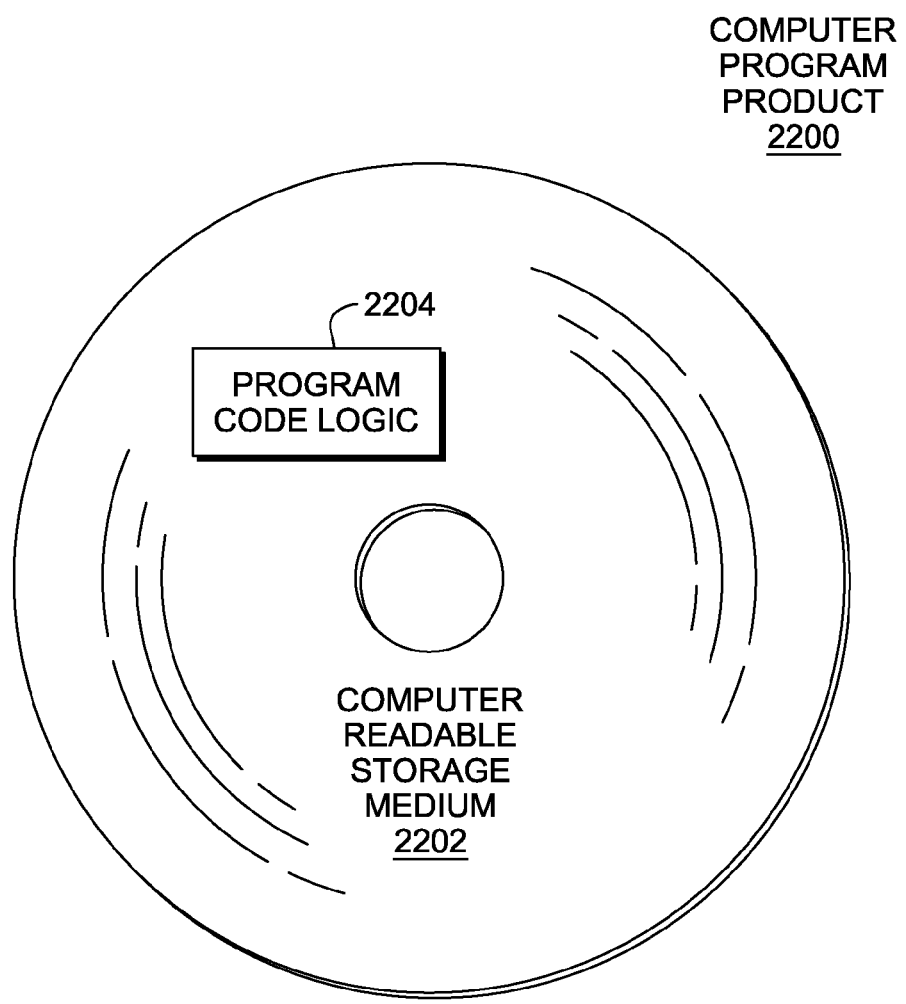
FIG. 22 depicts one embodiment of a computer program product incorporating one or more aspects of the present invention.

Referring now to FIG. 22, in one example, a computer program product 2200 includes, for instance, one or more computer readable media 2202 to store computer readable program code means or logic 2204 thereon to provide and facilitate one or more aspects of the present invention.

Program code contained or stored in/on a computer readable medium can be obtained and executed by a data processing system (computer, computer system, etc. including a component thereof) and/or other devices to cause the data processing system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more data processing system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which comprises one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    detecting, by a hypervisor executing on a processor, an introspection event generated by a target guest virtual machine of the hypervisor, the detecting being based on a target guest virtual machine fault configured by the hypervisor to be generated by the target guest virtual machine upon selected target guest virtual machine instruction execution;
    determining whether the detected introspection event is of interest for handling by a component coupled to the hypervisor; and
    based on determining that the introspection event is of interest for handling by the component, alerting, by the hypervisor, the component about the introspection event, and providing information associated with the introspection event to the component to facilitate run-time, event-driven virtual machine introspection of the target guest virtual machine.

2. The method of claim 1, wherein the detecting, determining, and alerting are performed during runtime of the target guest virtual machine, wherein providing information associated with the introspection event comprises automatically providing a processing context of at least one virtual central processing unit executing the target guest virtual machine during runtime of the target guest virtual machine.

3. The method of claim 1, wherein the introspection event comprises a system call, wherein the target guest virtual machine fault comprises a fault generated by the target guest virtual machine based on the target guest virtual machine attempting the system call, and wherein providing information associated with the introspection event comprises providing the component with access to memory of the target guest virtual machine to obtain system call context therefrom, the system call context comprising one or more arguments of the system call, and wherein the component comprises a handler for parsing the system call context.

4. The method of claim 1, further comprising modifying a model-specific register, wherein the modifying configures a general protection or undefined opcode fault to be raised, the general protection or undefined opcode fault being the target guest virtual machine fault configured by the hypervisor to be generated, thereby facilitating selectively enabling detection of introspection events generated by the target guest virtual machine to facilitate virtual machine introspection of the target guest virtual machine.

5. The method of claim 4, further comprising, based on determining that detection of introspection events for the target guest virtual machine is to be disabled, selectively disabling detection of introspection events generated by the target guest virtual machine by restoring the model-specific register back to a state of the model-specific register prior to the modifying.

6. The method of claim 1, further comprising modifying an interrupt descriptor table entry, the modifying configuring the target guest virtual machine fault to be raised, wherein the modifying selectively enables detection of introspection events generated by the target guest virtual machine to facilitate virtual machine introspection of the target guest virtual machine.

7. The method of claim 6, further comprising, based on determining that detection of introspection events for the target guest virtual machine is to be disabled, selectively disabling detection of introspection events generated by the target guest virtual machine by restoring the interrupt descriptor table back to a state of the interrupt descriptor table prior to the modifying.

8. The method of claim 1, wherein the introspection event comprises attempted execution of the selected target guest virtual machine instruction by the target guest virtual machine, and wherein determining whether the introspection event is of interest comprises decoding the instruction to obtain an instruction type and determining whether the instruction type is of interest to the component.

9. The method of claim 1, wherein the introspection event comprises attempted execution of a system call, and wherein the determining whether the introspection event is of interest for handling by the component coupled to the hypervisor comprises the hypervisor checking a system call interception bitmap to determine whether the system call is a type which is of interest to the component.

10. The method of claim 9, wherein the checking by the hypervisor comprises the hypervisor determining a system call number of the system call and indexing into the system call interception bitmap to check a bit associated with the system call number, the bit indicating whether the system call number is of interest to the component.

11. The method of claim 1, wherein the introspection event comprises a fast system call, and wherein the method further comprises, based on an indication from the component that a return of the fast system call is to be intercepted, saving a stack pointer of a thread of the target guest virtual machine making the fast system call.

12. The method of claim 11, further comprising:
    detecting, by the hypervisor, another introspection event generated by the target guest virtual machine, the another introspection event comprising a fast system call return; and
    checking to determine whether a stack pointer of a thread causing the fast system call return is saved, wherein based on saving the stack pointer of the thread of the target guest virtual machine making the fast system call, the hypervisor determines that the stack pointer is saved and alerts the component that the return of the fast system call has occurred.

13. The method of claim 1, wherein the introspection event comprises an interrupt, and wherein the method further comprises:
    based on an indication from the component that a return of the interrupt is to be intercepted, changing a permission in a stack segment register to cause the target guest virtual machine to fault to the hypervisor upon return of the interrupt; and
    based on the target guest virtual machine faulting to the hypervisor upon return of the interrupt, alerting the component that the return of the interrupt has occurred.

14. The method of claim 1, further comprising:
    detecting, by the hypervisor, another introspection event generated by the target guest virtual machine of the hypervisor, the detecting of the another introspection event being based on another target guest virtual machine fault configured by the hypervisor to be generated by the target guest virtual machine upon selected target guest virtual machine instruction execution;

determining whether the another introspection event is of interest for handling by the component; and based on determining that the another introspection event is not of interest for handling by the component, resuming execution of the target guest virtual machine absent alerting the component of the another introspection event, wherein the detecting and resuming are performed as part of a virtual machine exit handler of the hypervisor absent descheduling a virtual central processing unit of the target guest virtual machine.

15. The method of claim 1, wherein the component coupled to the hypervisor comprises a privileged guest virtual machine of the hypervisor.

16. The method of claim 1, further comprising configuring breakpointing in order to break to the hypervisor during execution of the target guest VM, wherein the configuring breakpointing comprises:

overwriting a target instruction to be executed by the target guest VM with an instruction configured to cause a break to the hypervisor to occur; and revoking permissions of a target guest VM memory page of which the target instruction is a part to drive a fault upon attempted read or write access of the memory page by the target guest VM.

17. The method of claim 16, wherein the method further comprises:

based on a break to the hypervisor upon encountering the instruction configured to cause the break to the hypervisor to occur, performing breakpoint handling by the hypervisor, wherein the breakpoint handling comprises:

based on determining that the breakpoint was generated for introspection purposes, restoring the target instruction for execution by the target guest VM, in which the instruction configured to cause a break to hypervisor is overwritten with the target instruction for execution;

notifying the component coupled to the hypervisor of the breakpoint;

resuming execution of the target guest VM for a single instruction, wherein the restored target instruction is to be executed by the target guest VM;

restoring the instruction configured to cause a break to hypervisor, the restoring comprising again overwriting the target instruction to be executed by the target guest VM with the instruction configured to cause a break to hypervisor to occur; and resuming execution of the target guest VM; and based on a break to the hypervisor upon attempted read or write access of the memory page by the target guest VM:

restoring page permissions of the target guest VM memory page to enable the read or write access thereto by the target guest VM;

restoring the target instruction for execution by the target guest VM, in which the instruction configured to cause a break to hypervisor is overwritten with the target instruction for execution;

resuming execution of the target guest VM for a single instruction, wherein the read or write access to the target guest VM memory page by the target guest VM occurs;

restoring the instruction configured to cause a break to hypervisor, the restoring comprising again overwriting the target instruction to be executed by the target guest VM with the instruction configured to cause a break to hypervisor to occur;

again revoking permissions of the target guest VM memory page to drive a fault upon attempted read or write access of the memory page by the target guest VM; and resuming execution of the target guest VM.

18. A computer system comprising:

a memory; and a processor in communication with the memory, the computer system configured to perform a method comprising:

detecting, by a hypervisor executing on the processor, an introspection event generated by a target guest virtual machine of the hypervisor, the detecting being based on a target guest virtual machine fault configured by the hypervisor to be generated by the target guest virtual machine upon selected target guest virtual machine instruction execution;

determining whether the introspection event is of interest for handling by a component coupled to the hypervisor; and based on the introspection event being of interest for handling by the component, alerting, by the hypervisor, the component about the introspection event, and providing information associated with the introspection event to the component to facilitate runtime, event-driven virtual machine introspection of the target guest virtual machine.

19. A computer program product comprising:

a non-transitory storage medium readable by a processor and storing instructions for execution by the processor to perform a method comprising:

detecting, by a hypervisor executing on a processor, an introspection event generated by a target guest virtual machine of the hypervisor, the detecting being based on a target guest virtual machine fault configured by the hypervisor to be generated by the target guest virtual machine upon selected target guest virtual machine instruction execution;

determining whether the introspection event is of interest for handling by a component coupled to the hypervisor; and based on the introspection event being of interest for handling by the component, alerting, by the hypervisor, the component about the introspection event, and providing information associated with the introspection event to the component to facilitate runtime, event-driven virtual machine introspection of the target guest virtual machine.

20. A method comprising:

specifying, for a hypervisor, by a component, one or more introspection events that are of interest to the component for introspection of a target guest virtual machine of the hypervisor, wherein the introspection events are triggered at runtime of the target guest virtual machine based on a target guest virtual machine fault configured by the hypervisor to be generated by the target guest virtual machine upon selected target guest virtual machine instruction execution; and based on occurrence of an introspection event of interest during execution of the target guest virtual machine:

receiving notification of occurrence of the introspection event from the hypervisor; and obtaining information associated with the introspection event.

21. The method of claim 20, wherein the specifying comprises at least one of: setting at least one bit of a data structure to indicate that the component is interested in a specific type of system call, or communicating to the hypervisor to cause setting of the at least one bit.

22. The method of claim 21, wherein the introspection event is a system call of the specified type, wherein the target guest virtual machine fault comprises a fault generated by the target guest virtual machine based on the target guest virtual machine attempting the system call, and wherein the method further comprises, based on receiving notification of the system call, determining whether a return of the system call is to be intercepted by the hypervisor.

23. The method of claim 22, wherein based on determining that the return of the system call is to be intercepted by the hypervisor, the method further comprises causing the hypervisor save an indication that the return is to be intercepted by the hypervisor.

24. The method of claim 23, wherein the system call comprises a fast system call by the target guest virtual machine, and wherein the component causes the hypervisor to save a stack pointer value for a thread of the target guest virtual machine making the fast system call.

25. The method of claim 20, wherein the system call comprises an interrupt by the target guest virtual machine, and wherein the component causes the hypervisor to change a permission in a stack segment register to cause the target guest virtual machine to fault to the hypervisor upon return of the interrupt.

26. The method of claim 20, further comprising:
determining, based on context switches to and from the target guest virtual machine, whether interception of introspection events generated by the target guest virtual machine during runtime thereof is to be enabled or disabled; and
based on the determining, notifying the hypervisor that interception of introspection events generated by the target guest virtual machine during runtime thereof is to be enabled or disabled.

27. The method of claim 20, wherein the introspection event comprises a system call by the target guest virtual machine to list one or more files in a directory, and wherein the method further comprises modifying one or more parameters of the system call to simulate existence, in the directory, of one or more files.

28. The method of claim 27, wherein the method further comprises writing to a memory buffer based on the target guest virtual machine attempting to read or write from or to a file of the one or more files for which existence is being simulated.

29. The method of claim 20 wherein the obtaining comprises using a pointer to guest memory of the target guest virtual machine to access the guest memory and obtain therefrom information about of the introspection event.

30. A computer system comprising:
a memory; and
a processor in communication with the memory, the computer system configured to perform a method comprising:
specifying, for a hypervisor, by a component, one or more introspection events that are of interest to the component for introspection of a target guest virtual machine of the hypervisor, wherein the introspection events are triggered at runtime of the target guest virtual machine based on a target guest virtual machine fault configured by the hypervisor to be generated by the target guest virtual machine upon selected target guest virtual machine instruction execution; and
based on occurrence of an introspection event of interest during execution of the target guest virtual machine:
receiving notification of occurrence of the introspection event from the hypervisor; and
obtaining information associated with the introspection event.

31. A computer program product comprising:
a non-transitory storage medium readable by a processor and storing instructions for execution by the processor to perform a method comprising:
specifying, for a hypervisor, by a component, one or more introspection events that are of interest to the component for introspection of a target guest virtual machine of the hypervisor, wherein the introspection events are triggered at runtime of the target guest virtual machine based on a target guest virtual machine fault configured by the hypervisor to be generated by the target guest virtual machine upon selected target guest virtual machine instruction execution; and
based on occurrence of an introspection event of interest during execution of the target guest virtual machine:
receiving notification of occurrence of the introspection event from the hypervisor; and
obtaining information associated with the introspection event.

* * * * *